US012590204B2

(12) United States Patent
Lundin et al.

(10) Patent No.: US 12,590,204 B2
(45) Date of Patent: Mar. 31, 2026

(54) COLOR CHANGING COAXIAL POLYMER FIBERS

(71) Applicant: The Government of the United States of America, as represented by the Secretary of the Navy, Arlington, VA (US)

(72) Inventors: Jeffrey G. Lundin, Burke, VA (US); Matthew D. Thum, Annapolis, MD (US); Jakub Kolacz, Alexandria, VA (US); Daniel Ratchford, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 663 days.

(21) Appl. No.: 18/045,142

(22) Filed: Oct. 7, 2022

(65) Prior Publication Data

US 2023/0115308 A1 Apr. 13, 2023

Related U.S. Application Data

(60) Provisional application No. 63/253,463, filed on Oct. 7, 2021.

(51) Int. Cl.

*C08K 9/10* (2006.01)
*C08K 5/23* (2006.01)
*C08K 5/315* (2006.01)
*D01D 5/34* (2006.01)
*D01F 1/10* (2006.01)
*D01F 8/04* (2006.01)

(52) U.S. Cl.

CPC .................. *C08K 9/10* (2013.01); *C08K 5/23* (2013.01); *C08K 5/315* (2013.01); *D01D 5/34* (2013.01); *D01F 1/10* (2013.01); *D01F 8/04* (2013.01)

(58) Field of Classification Search

CPC . C08K 9/10; C08K 5/23; C08K 5/315; D01D 5/34; D01F 1/10; D01F 8/04

See application file for complete search history.

(56) References Cited

FOREIGN PATENT DOCUMENTS

WO 2019079478 A1 4/2019
WO 2020169843 A1 8/2020

OTHER PUBLICATIONS

Search Report and Written Opinion in PCT/US2022/077823 (Feb. 2, 2023).
Bertocchi et al., "Electrospun Polymer Fibers Containing a Liquid Crystal Core: Insights into Semiflexible Confinement" J. Phys. Chem. C 2018, 122, 16964-16973.
Dicker et al., "Surfactant Modulated Phase Transitions of Liquid Crystals Confined in Electrospun Coaxial Fibers" Langmuir 2020, 36, 7916-7924.
Enz et al., "Coaxial electrospinning of liquid crystal-containing poly(vinylpyrrolidone) microfibres" Beilstein J. Org. Chem. 2009, 5, No. 58.
Enz et al., "Electrospun microfibres with temperature sensitive iridescence from encapsulated cholesteric liquid crystal" J. Mater. Chem., 2010, 20, 6866-6872.
Kye et al., "Multifunctional responsive fibers produced by dual liquid crystal core electrospinning" J. Mater. Chem. C, 2015, 3, 8979.
Reyes et al., "Non-electronic gas sensors from electrospun mats of liquid crystal core fibres for detecting volatile organic compounds at room temperature" Liquid Crystals, 2016 vol. 43, Nos. 13-15, 1986-2001.
Thum et al., "Azobenzene-Doped Liquid Crystals in Electrospun Nanofibrous Mats for Photochemical Phase Control" ACS Appl. Nano Mater. 2021, 4, 297-304.
Thum et al., "Photochemical phase and alignment control of a nematic liquid crystal in core-sheath nanofibers" J. Mater. Chem. C, 2021, 9, 12859.
Thum et al., "Dynamic Interference Colors in Electrospun Microfibrous Mats" Adv. Optical Mater. 2022, 10, 2200192.

*Primary Examiner* — Patrick D Niland
(74) *Attorney, Agent, or Firm* — US Naval Research Laboratory; Joseph T. Grunkemeyer

(57) ABSTRACT

Disclosed herein is a fiber having a sheath including a polymer and a core including a non-cholesteric liquid crystal. The sheath is transparent to visible light. The fiber may an average diameter of no more than 10 microns, and at least 90% of the fiber has a diameter within 20% of the average diameter. The sheath may include a compound capable of photoisomerization that extends into the core. The interference color of the fiber may be reversibly changed by exposure to light or a temperature change.

21 Claims, 27 Drawing Sheets
(25 of 27 Drawing Sheet(s) Filed in Color)

$$\Delta n(\lambda) = n_e(\lambda) - n_o(\lambda)$$

1 2 $C_4AzoC_6PEG_3$

PVP

$M_n$ = 1,300,000 g/mol

5CB

Cr → N, 23 °C

N → I, 35 °C

$C_4AzoC_6PEG_3$

COLOR CHANGING COAXIAL POLYMER FIBERS

This application claims the benefit of U.S. Provisional Application No. 63/253,463, filed on Oct. 7, 2021. The provisional application and all other publications and patent documents referred to throughout this nonprovisional application are incorporated herein by reference.

TECHNICAL FIELD

The present disclosure is generally related to polymeric fibers containing a liquid crystal.

DESCRIPTION OF RELATED ART

Many living organisms commonly found in nature exhibit control over their color and shape for communication, camouflage and more. Examples such as a chameleon's effortless ability to change its color to mimic the environment, or the Humboldt squid's exceptional ability to modulate the pattern of its skin pigment for communication provide a source of inspiration to continually develop more advanced material systems with dynamic properties.[1,2]

Of the multitude of systems that exhibit stimuli-responsive behavior, liquid crystals (LCs) have garnered great interest due to their unique physical and optical properties. The ability to precisely control the phase and alignment of liquid crystals and liquid crystalline elastomers has been demonstrated in their use in color and shape change materials encoding information and anti-counterfeiting.[3-7] Commonly, liquid crystal based functional materials rely on the color-change ability of cholesteric LCs which can selectively reflect light according to the helical pitch of the circular director. Many systems have explored the color change of cholesteric LC materials in response to external stimuli such as light, heat, and mechanical stress.[8-11]

Currently, using chiral-doped LCs has been the major method to achieve color-change in LC materials, however, there are issues with the implementation of cholesteric LC materials. First of all, the induction of chirality into the LC mesophase is generally done using a chiral dopant in a multi component system.[12] Additionally, the optical properties of the cholesteric LCs are sensitive to alignment leading to the development of many techniques such as rubbing, covalently attaching the LC to nanoparticles, and photoinduced alignment, to induce a particular alignment in a LC material.[13-15]

BRIEF SUMMARY

Disclosed herein is a fiber comprising: a sheath comprising a polymer and a core comprising a non-cholesteric liquid crystal. The sheath is transparent to visible light. The fiber has an average diameter of no more than 10 microns. At least 90% of the fiber has a diameter within 20% of the average diameter.

Also disclosed herein is a fiber comprising: a sheath comprising a polymer and a compound capable of photoisomerization and a core comprising a non-cholesteric liquid crystal. The sheath is transparent to visible light. The compound capable of photoisomerization extends into the core.

Also disclosed herein is a method comprising: providing the above fiber, wherein the fiber exhibits a first interference color, and exposing the fiber to light of a wavelength that causes the fiber to exhibit a second interference color different from the first interference color.

Also disclosed herein is a method comprising: providing any of the above fibers at a first temperature, wherein the fiber exhibits a first interference color at the first temperature, and changing the temperature of the fiber to a second temperature that causes the fiber to exhibit a second interference color different from the first interference color.

Also disclosed herein is a method comprising: providing a first solution comprising 15-20 wt. % of a polymer, 0.01-0.1 wt. % sodium chloride, and ethanol; providing a second solution comprising a liquid crystal; and electrospinning the first solution and the second solution to form a fiber comprising a sheath comprising the polymer and a core comprising the liquid crystal. the electrospinning is performed at 5-13 kV, 8-14 cm from a substrate, and no more than 20% relative humidity.

Also disclosed herein is a compound having the formula:

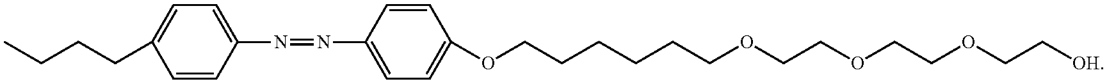 [SMILES: CCCCc1ccc(N=Nc2ccc(OCCCCCCOCCOCCOCCO)cc2)cc1]

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation will be readily obtained by reference to the following Description of the Example Embodiments and the accompanying drawings.

In FIG. 3A, the birefringence of the sample is varied from 0 (non-birefringent) to 0.2 (extremely birefringent) to highlight the different interference colors possible along a range of birefringent materials. The liquid crystal employed in this study, 5CB, has been shown to have birefringence of 0.15-0.21 across multiple wavelengths with reported birefringence of 1.54 in the visible region.[16, 17] In FIG. 3B, the Raith-Sørensen chart has been appended to show the calculated interference colors for 5CB with a thickness of 0-6 μm.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein are multifunctional optical fibers with the capability to control color through temperature (thermotropic) and light (photochromic) stimulation. The coaxial fibers have an outer polymer sheath encapsulating a liquid crystal solution in the core. The color of the coaxial fibers can be tuned through modulating the fiber core diameter. The liquid crystal core solution does not require solvent, additives, or dopants, resulting in facile fabrication. Photochromic dopants may be included in the polymer sheath to impart dynamic photo-switching character to the liquid crystal core.

Figure 1A:
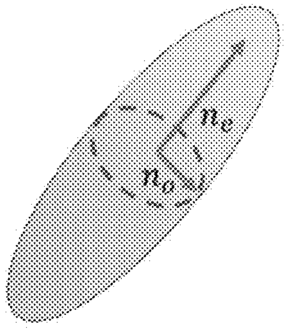
FIG. 1A shows an illustration of the ordinary ($n_o$) and extraordinary ($n_e$) axes in a rod-shaped nematic LC such as 5CB. The birefringence ($\Delta n$) of the sample is a result of the difference in its refractive index along these two axes.
Figure 1B:
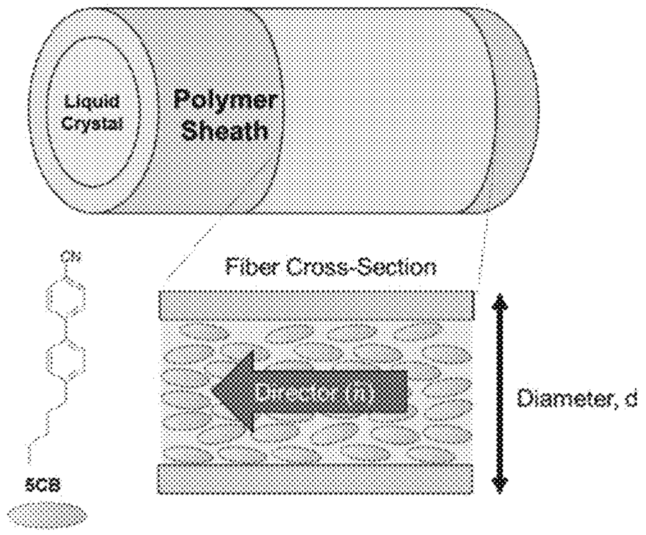
FIG. 1B shows a depiction of a core-sheath nanofiber with a polymer sheath and an LC core. When 5CB is encapsulated within PVP its displays planar alignment with its director pointing towards the fiber long-axis.[30, 32, 40]
Figure 1C:
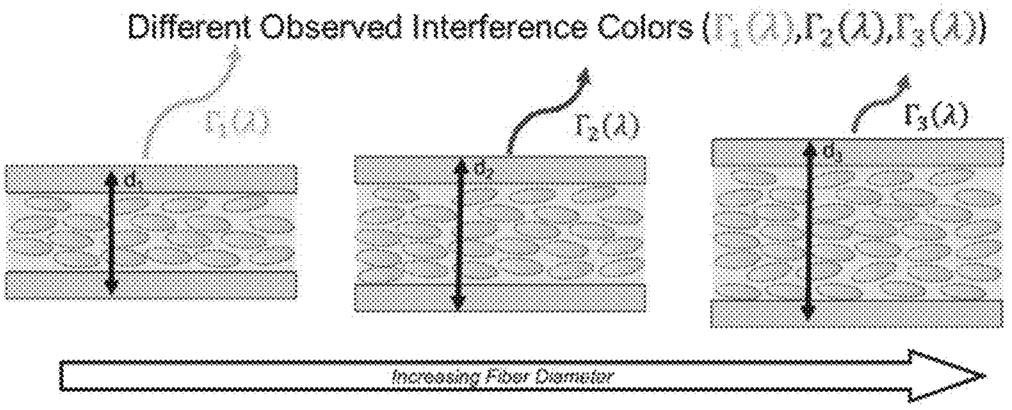
FIG. 1C shows differences in fiber diameter due to an increase in the amount of encapsulated LC and the effect that it can have on the interference color as the thickness of the birefringent LC core changes with fiber diameter.

The fibers represent the first example of using the interference colors of liquid crystals to fabricate soft, flexible color-changing materials using only the perceived interference colors of a nematic LC. FIGS. 1A-C show a simple system with no additional LC dopants to take advantage of the dynamic interference colors of thin layers of a nematic liquid crystal (5CB). Encapsulation of 5CB in polymer nanofibers with precise control over the fiber morphology enables the fabrication of soft, flexible materials that display dynamic multistimuli-responsive interference color change. Electrospinning was used to fabricate nanofibrous mats composed of core-sheath nanofibers with thermally responsive, photochemically responsive, and confinement-sensitive interference colors. Furthermore, these colors were viewed on a micro (μm) scale in individual fibers and on a macro (mm) scale in fibrous mats. Interference color charts were calculated for 5CB and were used to demonstrate the range of colors that can be achieved with electrospinning and compare the colors that are seen in fibers with the predicted colors according to calculations. Finally, it was demonstrated that the interference colors can be controlled thermally and, with the addition of a photochromic surfactant into the polymer sheath, photochemically.

As shown in FIG. 1B, the fiber has a core coaxially surrounded by a sheath. The sheath is transparent to visible light. As used herein, "transparent" means that any colors of interest are observable though the sheath to some degree or to a degree detectable to the human eye. It need not be transparent to the entire visible spectrum, nor fully 100% transparent to the colors of intereset. One suitable polymer is polyvinylpyrrolidone (PVP).

The core comprises a non-cholestric liquid crystal. The liquid crystal may be, for example, 4-cyano-4'-n-pentylbiphenyl (CB5). The core may be a solution of the LC, which, as used herein, includes neat LC.

In some embodiments, the fiber has a tightly controlled diameter. For example. the fiber may an average diameter of no more than 10, 9, 8, 7, 6, 5, 4, or 3 microns. At least 90%, 95%, or every point along the length of the fiber may have a diameter within 20% of the average diameter and be free of fiber beading or other non-uniform morphologies. One example fiber disclosed herein has a diameter of 2.35±0.20 μm.

This uniformity of the fiber diameter can lead to uniformity of the interference color of the fiber when placed between crossed polarizers. As explained herein, the interference color is highly dependent on fiber diameter. The fiber has an average interference color over the entire fiber. By controlling the diameter, at least 90%, 95%, or every point along the fiber may have an interference color wavelength within 10% of the average interference color wavelength.

Such fibers may be made by electrospinning under certain conditions. Methods of using electrospinning to make a core-sheath fiber are known in the art. The method uses a first solution comprising the polymer and a second solution comprising the liquid crystal. The first solution may include 15-20 wt. % of the polymer, 0.01-0.1 wt. % sodium chloride, and up to the balance of ethanol. As used herein, the solution of liquid crystal may be neat liquid crystal. The solutions may be electrospun at 5, 6, 7, 8, 9, 10, 11, 12, or 13 kV (or any value between these), with the tip 8, 9, 10, 11, 12, 13, or 14 cm (or any value between these) from the substrate. The ambient conditions may include no more than 10% or 20% relative humidity.

In some embodiments, the first solution includes a compound capable of photoisomerization to incorporate the compound into the sheath. At least some of the molecules of the compound will extend into the core. Suitable compounds include azobenzenes, such as $C_4AzoC_6PEG_3$, shown below. Different photoisomers of the compound may produce different interference colors.

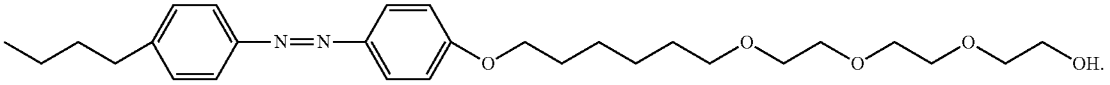 [SMILES: CCCCc1ccc(N=Nc2ccc(OCCCCCCOCCOCCOCCO)cc2)cc1]

The electrospinning may produce a nanofibrous mat of the fiber having the same interference color properties as the individual fibers. The mat may be 100% of the fibers, or at least 50 wt. % of the fibers. The mat may be useful as a display device. In addition to a mat form, an article of any shape and dimension may include the fibers.

The interference color may be temperature dependent. The fiber or mat has an average interference color at a first temperature, such as room temperature. The temperature of the fiber may be raised or lowered to a second temperature such that the fiber or mat has a second, different interference color. When the first temperature is restored, the interference color may go back to the first color. The fiber may be repeatedly cycled between the two temperatures and colors.

Figure 2:
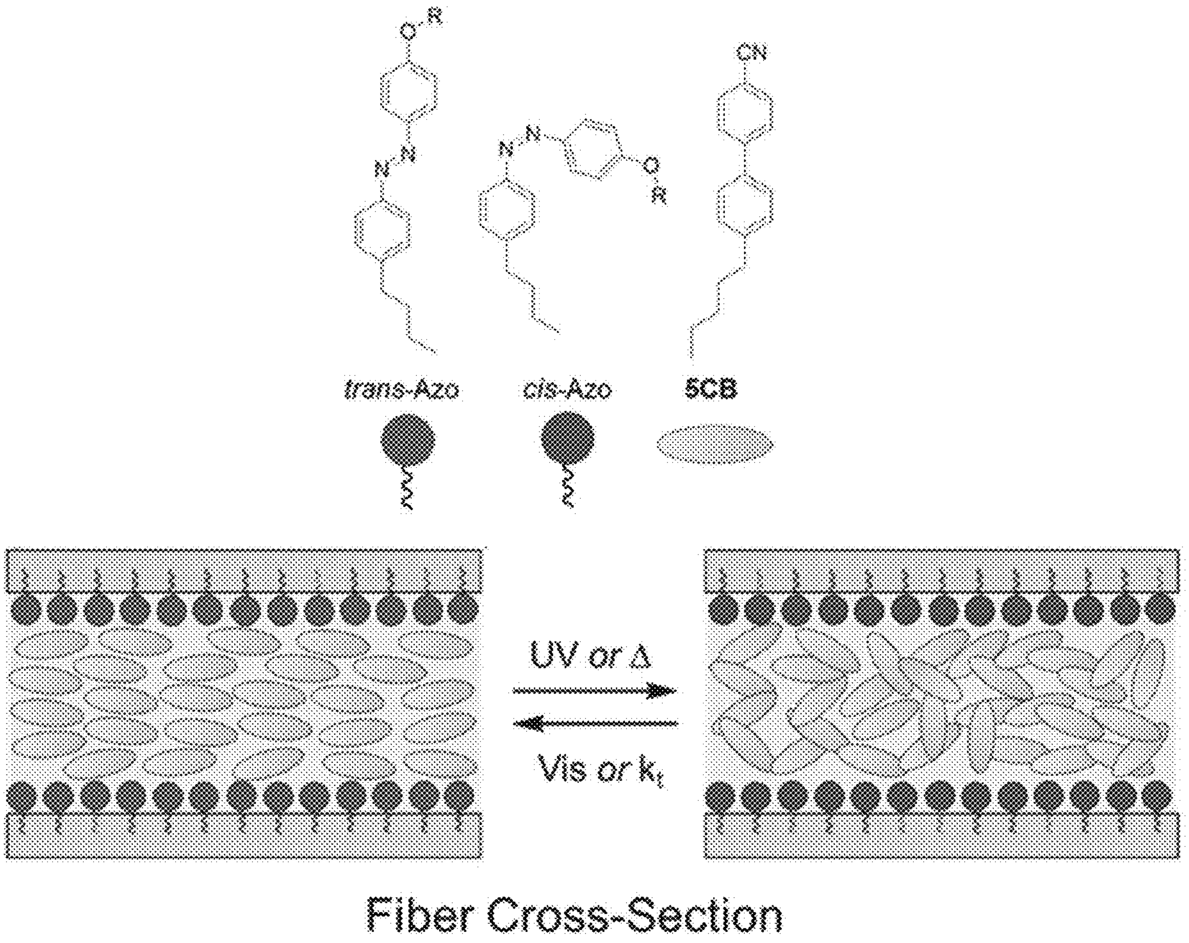
FIG. 2 schematically illustrates the effect of photoisomerization on an LC core. Irradiation of nanofibers containing $C_4AzoC_6PEG_3$ results in the disorder of the LC core and a depression of the N→I transition temperature which is reversible with visible light.

The photoisomerable compound may be used to change the interference color. Exposing the fiber or mat to light of the proper wavelength may change the configuration of the compound, altering the alignment and interference color of the liquid crystal. A different wavelength of light can reverse the process. The fiber may be repeatedly cycled between the two colors. This process is schematically illustrated in FIG. 2

The demonstration of photochromic and thermochromic control of color in coaxial electrospun fibers using a simple nematic LC represents a new material development. Modulation of the material dimensions, specifically the core diameter, enables control of the observed color under cross polarizers. Use of the azobenzene derived dopant ($C_4AzoC_6OAc$) in the polymer sheath imparts the ability to impart photochromic behavior without modifying existing nematic LC compounds in the core. Distinctly, the thermotropic and phototropic color changing effects enabled by controlling the fiber diameter are demonstrated in coaxial polymer fibers, which allow for a wide range of potential applications, spanning textiles, fibers, electronics, and sensors due to the fibrous form factor and flexible nature of polymer fibers.

An important tool of mineralogy, the Michel-Lévy interference color chart relates sample thickness, retardation, and birefringence to the interference color(s) observed when viewing an anisotropic material under crossed polarized light. When plane polarized light passes through a birefringent sample, it is split into perpendicular slow and fast rays corresponding to the velocity at which the light passes through the sample according to its refractive indices. The light emerging from the sample has a retardation corresponding to the path difference between the two perpendicular rays. After recombination in the analyzer, the light is subject to destructive interference that results in the interference colors observed. In this work, a modified Michel-Lévy interference color chart, the Raith-Sørensen, was calculated to determine the interference color(s) of a birefringent sample at with varying thickness and birefringence (FIGS. 3A-B and 4).

Figure 3A:
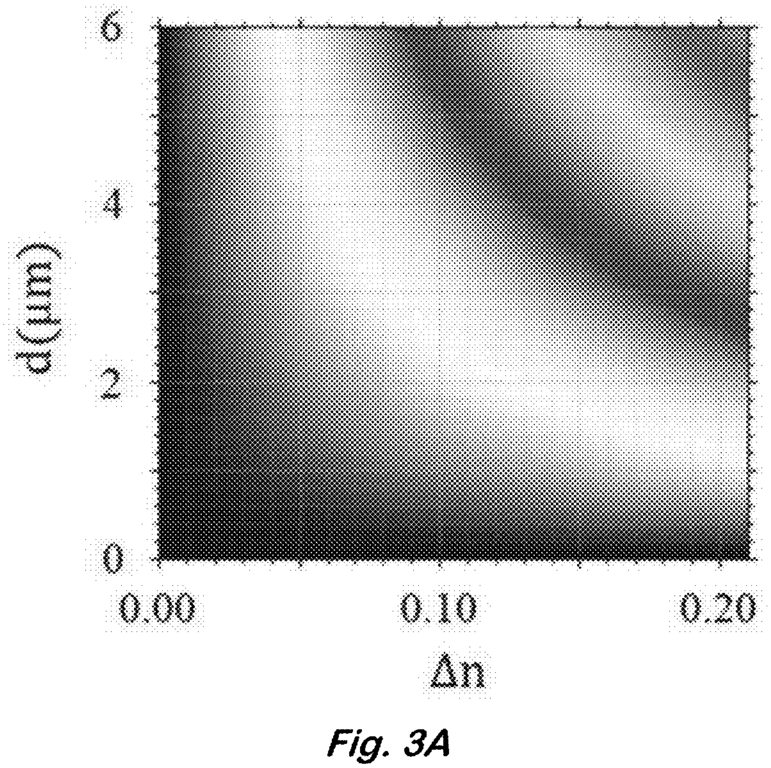
FIGS. 3A-B show computed Raith-Sørensen chart showing the interference colors of a birefringent sample with a thickness of 0-6 μm.
Figure 3B:
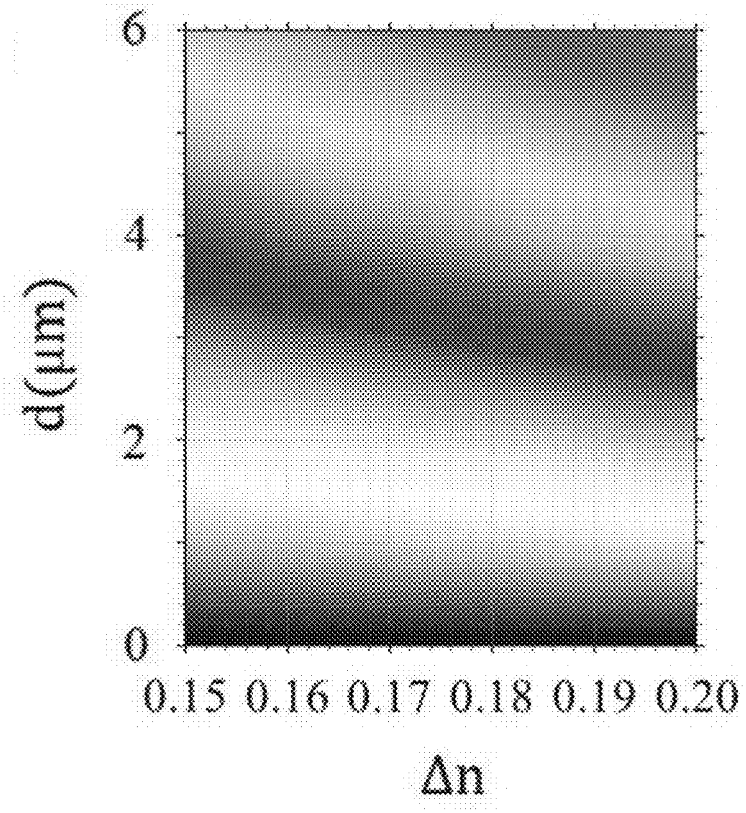
Figure 4:
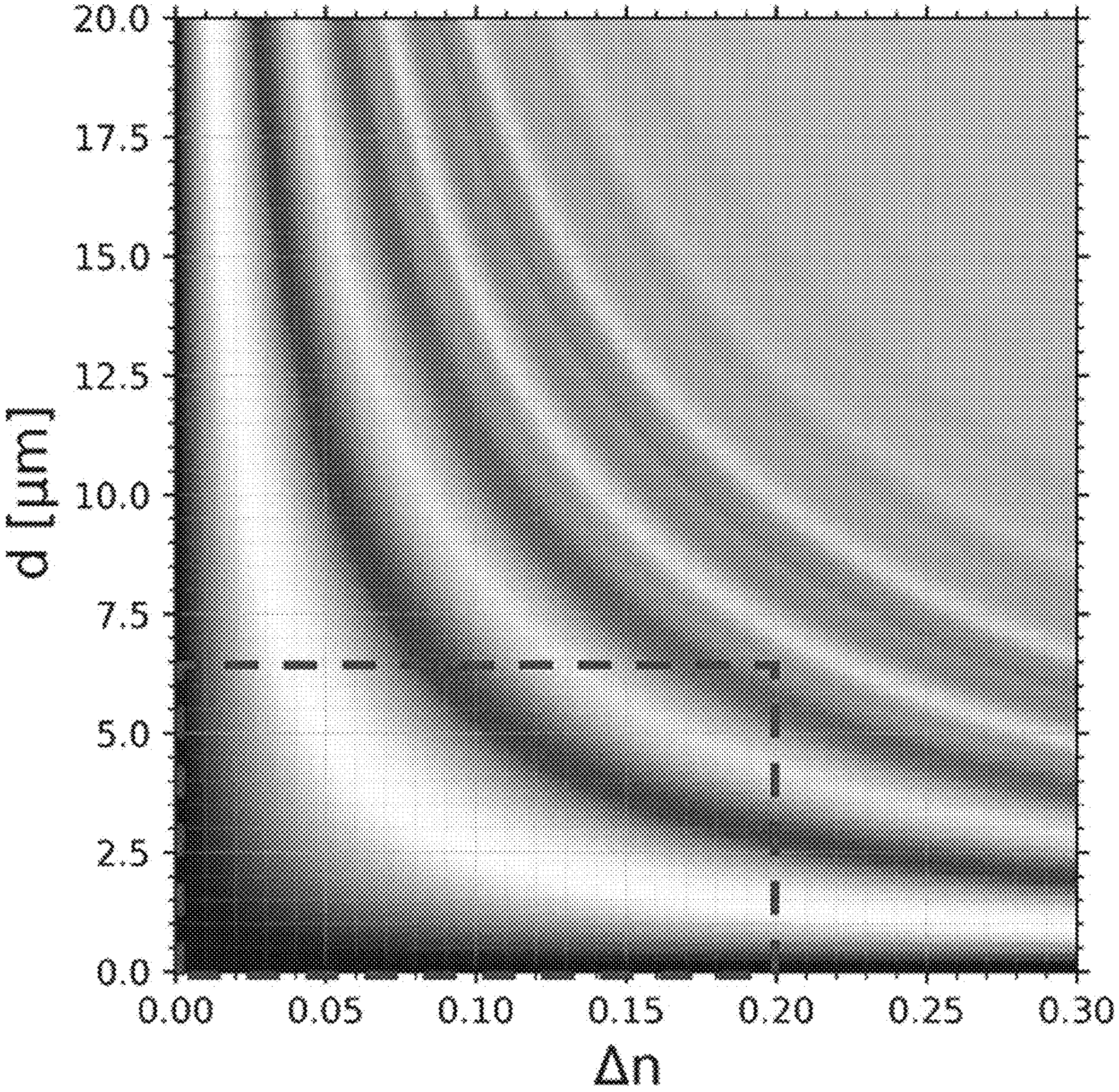
FIG. 4 shows a Raith-Sørensen chart showing the interference colors for a birefringent material with a thickness of 0-20 μm. The red dotted line shows the area corresponding to the electrospun fibers prepared herein.

The interference color charts shown in FIGS. 3A-B are generated according to the following equations. Light transmitted through a birefringent material experiences a relative phase retardation, (Γ) based on the material birefringence (Δn), thickness (d) and wavelength (λ) according to equation (1).

$$\Gamma = \frac{2\pi \cdot \Delta n \cdot d}{\lambda} \quad (1)$$

Between crossed-polarizers, the transmitted intensity (I) between crossed-polarizers is given by equation (2).

$$I = \frac{\sin^2\left(\frac{\Gamma}{2}\right)}{2} \quad (2)$$

With a white light source, the transmitted light spectrum is the sum of the intensity at each source wavelength according to equation (3).

$$L(\lambda) = \sin^2\left(\frac{\Gamma(\lambda)}{2}\right) \quad (3)$$

The resulting spectrum is converted into a CIE XYZ coordinate using color sensitivity functions and mapped onto the CIE1931 chromaticity chart to describe the perceived color shown in FIGS. 3A-B. From the chromaticity chart, the color is converted into an RGB value that can be displayed on a computer screen. The process has been described previously, and was implemented using Python.[18, 19] While this method can create a general Michel-Lévy chart, a more useful representation for the case in which thickness and birefringence can both be tuned is the Raith-Sørensen chart. The Raith-Sørensen chart highlights how the perceived color can vary by tuning either the thickness of a birefringent material or by changing the birefringence of a material with constant thickness, and has been used previously to examine the interference colors of liquid crystal films.[20]

The colors in the interference color chart are separated by orders. The first order starts with black, hues of gray and white followed by yellow, orange and, finally, the intense “first order red”. The second order has intense blue, green, yellow and orange, but the colors get progressively paler and desaturated at higher orders until the colors become completely white (FIG. 4). For liquid crystals, the most intense colors with broad color-diversity correspond to an optimal sample thickness of 2-10 μm (FIG. 4). To prepare flexible, soft materials that display the bright interference colors of 5CB that can be achieved with a diameter less than 10 μm, nonwoven fibrous mats were fabricated in which 5CB was encapsulated within nano-scale polymer fibers using coaxial electrospinning.

Coaxial electrospinning is an inexpensive, adaptable method for the encapsulation of LCs within a cylindrical morphology. In coaxial electrospinning, a dual-needle setup is used in which two solutions are pumped independently, using two syringe pumps, one each through a large diameter outer needle and a small diameter inner needle. A strong electric field is applied between a grounded collector and the needle tip causing a thin jet of material to expel from the Taylor cone formed at the needle tip. The solvent evaporates as the jet accelerates towards the grounded collector resulting in a thin, nonwoven mat of nanofibers deposited onto the collector plate. Coaxial electrospinning has enabled the formation of fibers with a broad range of morphologies from single and multi-channel fibers to nanowire-in microtube.[21-24]

When a polymer sheath solution and a neat LC core solution are used, the result is core/sheath nanofibers where the polymer sheath completely encompasses the LC core in a cylindrical nanofiber. Since the first report by Lagerwall, LC-core electrospun nanofibers have been extensively studied.[25-32] There are reports of the fabrication of electrospun nanofibers containing nematic, smectic, and cholesteric liquid crystal cores.[24, 26, 29-31, 33, 34] Importantly, LC-based nanofibers have been demonstrated for sensitivity towards gas, temperature, degree of confinement, and most recently in photoimaging and tissue engineering applications.[23, 30, 31, 33-37]

In this work flexible, soft, fibrous mats with dynamic interference color are fabricated using a polyvinylpyrrolidone (PVP) solution in ethanol as the polymer sheath and 5CB as the LC core. Fibers were made at different diameters corresponding to the primary colors of the interference color chart. PVP was chosen as the sheath material due to its non-crystalizing (i.e. non-birefringent) behavior and availability in high molecular weight, aiding in the formation of defect-free fibers. There are many factors that can affect fiber morphology such as applied voltage, relative humidity, solution flow rates, and distance from the needle tip to the collector.[38, 39] Previous work has shown that increasing the core flow rate while maintaining the sheath flow rate can result in uniform fibers with an increased diameter.[30] Herein, the process parameter of the electrospinning process (e.g. the core flow rate) is modified to for fibers with diameters on the order of the intense interference colors (2 μm>d>10 μm) shown in FIGS. 3A-B.

Disclosed is a dynamic, multiresponsive system where the interference colors of the LC core in electrospun core/sheath nanofibers and nanofibrous mats can be tuned with confinement (i.e. fiber diameter), temperature, and with UV/Vis irradiation. The electrospun fibers and fibrous mats display bright interference colors correspond to changing fiber diameters with changing core feed rate during the electrospinning process and the fiber diameter is consistent with a calculated Raith-Sørensen chart for 5CB. Thermal control is achieved by external heating changing the birefringence of the LC core as it becomes more isotropic. Finally, photochemical control over the interference colors of nanofibers and fibrous mats is achieved through the addition of a photochromic surfactant into the polymer sheath of the nanofibers. Irradiation of the azo surfactant-doped fibers leads to an increase in the disorder of the LC core, thus changing the observed interference color. All of the colors observed are distinct on a macro (mm) and micro (μm) scale meaning that any changes translate to the flexible fibrous mats.

The following examples are given to illustrate specific applications. These specific examples are not intended to limit the scope of the disclosure in this application.

Materials—Unless otherwise noted, all chemicals were provided by Sigma Aldrich. Polyvinylpyrrolidone (PVP) (Mw 1,300,000 g/mol) was obtained from Acros Organics, 4-Cyano-4'-n-pentylbiphenyl (5CB) was obtained from TCI America, Ethanol was obtained from The Warner-Graham Company, and Sodium Chloride was obtained from Fisher Scientific. The synthesis of $C_4AzoC_6PEG_3$ has been detailed previously[32] and is also described below. All materials were used as received.

Figure 5:
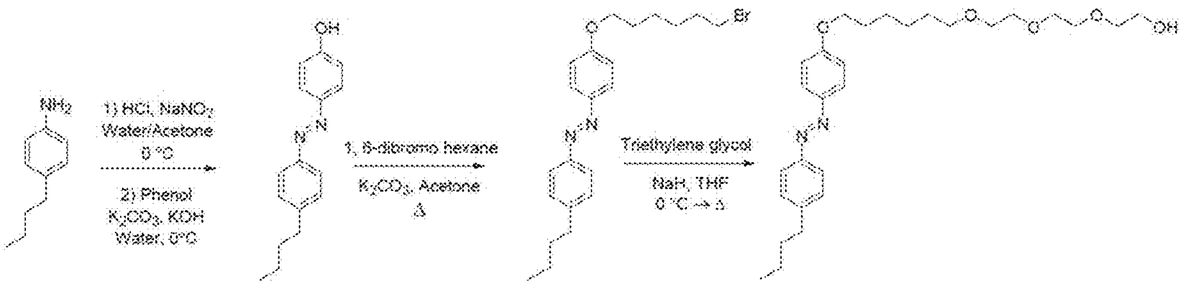
FIG. 5 shows a synthesis scheme for $C_4AzoC_6PEG_3$.
Figure 6:
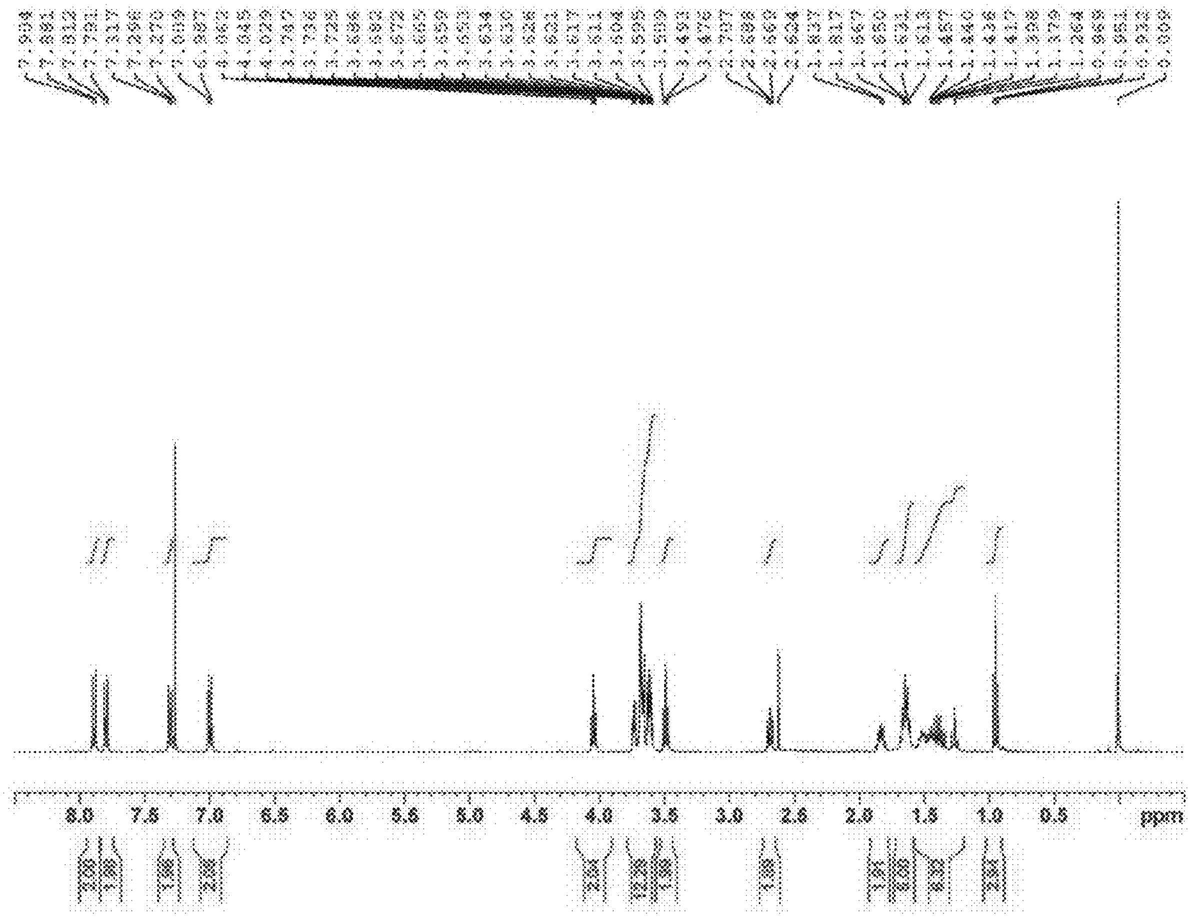
FIG. 6 shows $^1$H NMR (400 MHz) of $C_4AzoC_6PEG_3$ in $CDCl_3$.
Figure 7:
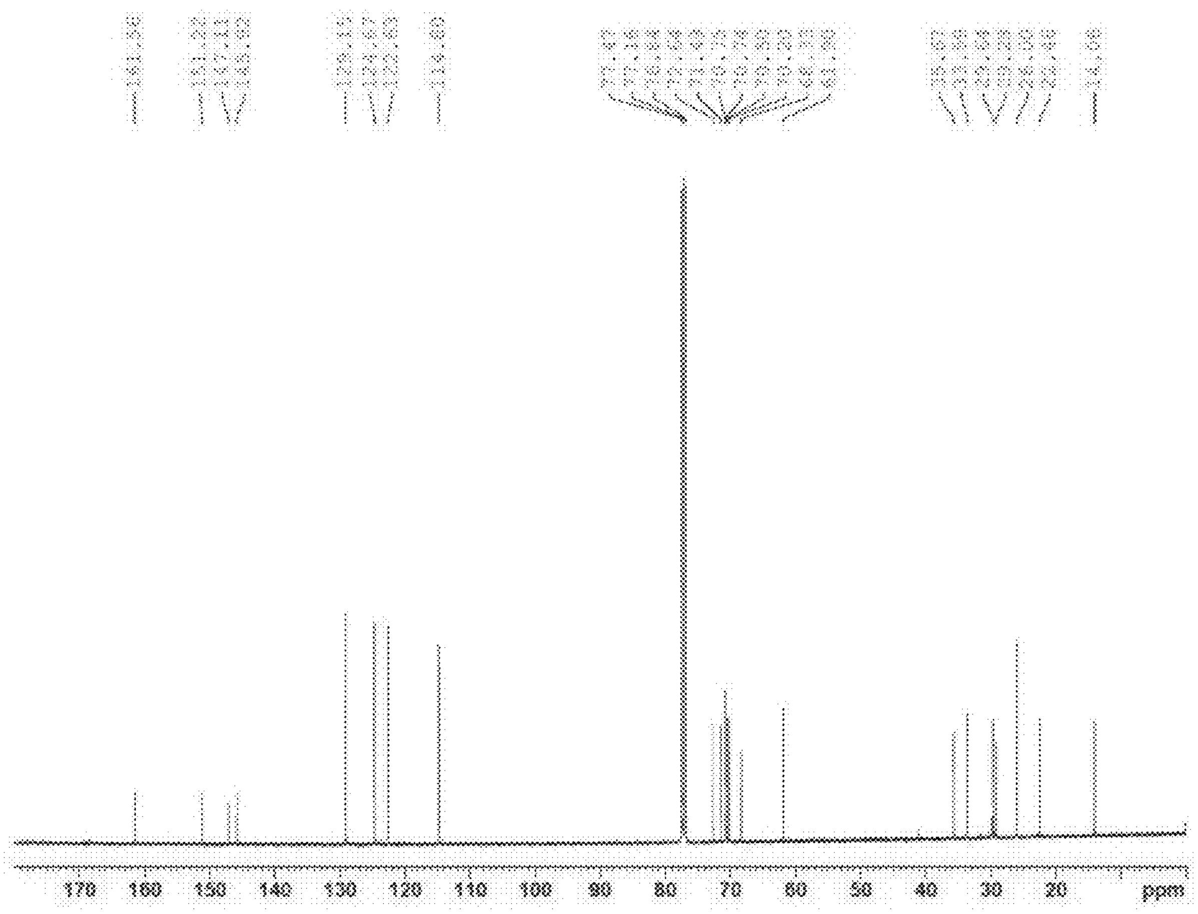
FIG. 7 shows $^{13}$C NMR (400 MHz) of $C_4AzoC_6PEG_3$ in $CDCl_3$.
Figure 8:
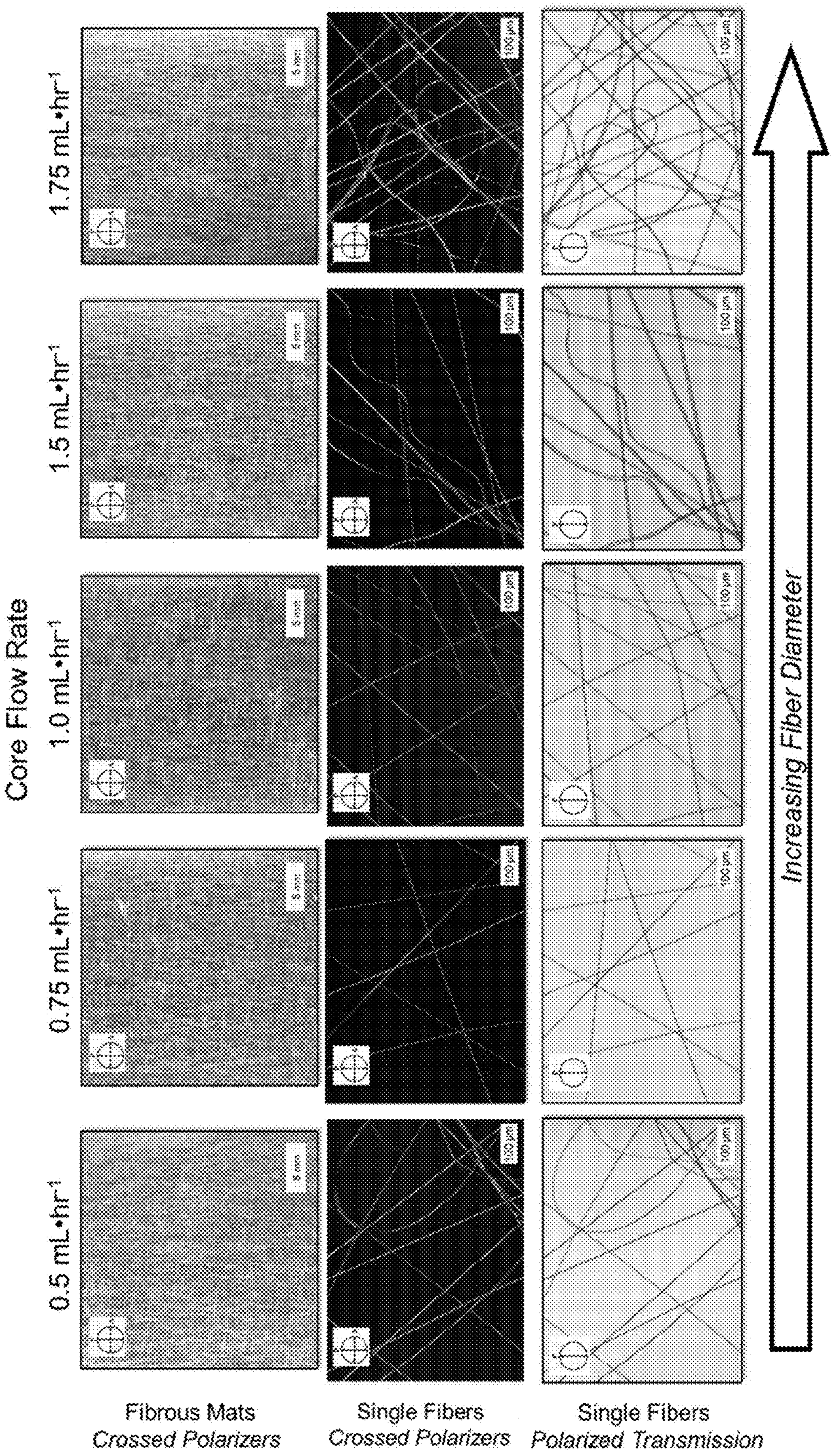
FIG. 8 shows images of fibrous mats (top row), and POM images of individual fibers under linearly polarized (bottom row) light and under crossed polarizers (middle row). All images shown at temperatures ranging from 24±1° C. The interference color of the fibers can be clearly seen in both the individual fibers and the fibrous mats when viewed under crossed polarizers. Increasing the core flow rate results in a change in the interference color observed. It is possible to manufacture fibers and mats that appear yellow, orange, magenta, blue and green under crossed polarizers. Under linearly polarized light, individual fibers also show clear interference colors ranging from shaded of red (1.5 and 1.75 $mL \cdot hr^{-1}$) to blue/green (0.5-1.00 $mL \cdot hr^{-1}$)

Synthesis of $C_4AzoC_6PEG_3$—The synthesis scheme is shown in FIG. 5. The synthesis of compounds 1 and 2 has been previously reported.[31] In a 250 mL round bottom flask equipped with a stirrer, 1.13 g of triethylene glycol (7.55 mmol) was added along with 100 mL of dry THF. The components were stirred at room temperature under $N_2$ for 20 minutes before NaH (300 mg, 12.5 mmol) was added. The solution was stirred at room temperature under $N_2$ for 2 hours. After, a solution of 2 (1.59 g, 3.8 mmol) in 50 mL of dry THF was added dropwise via cannula under $N_2$. After addition, the components were then refluxed under $N_2$ for 48 hours. The solvent was removed under reduced pressure and the residual solid was dissolved in chloroform where it was extracted with water (1×50 mL) and brine (1×50 mL). The organic layer was dried over sodium sulfate and the solvent was removed under reduced pressure to give a red oil which was purified via column chromatography (3:1 Hexanes/EtOAc) resulting in 1.015 g of $C_4AzoC_6PEG_3$ in 55% yield. The product was a red oil that solidified to an orange powder upon standing. $^1H$ NMR (FIG. 6) (400 MHz, $CDCl_3$) δ, ppm: 7.90 (d, 2H), 7.8 (d, 2H), 7.31 (d, 2H), 7.00 (d, 2H), 4.05 (d, 2H), 3.75-3.59 (m, 12H), 3.49 (t, 2H), 1.91 (m, 2H), 1.63 (m, 5H), 1.47-1.26 (m, 6H), 0.95 (t, 3H); $^{13}C$ NMR (FIG. 7) (400 MHz, $CDCl_3$) 13C NMR (400 MHz, $CDCl_3$) δ, ppm: 161.5, 151.2, 147.1, 145.9, 129.4, 124.6, 122.6, 114.8, 72.6, 71.4, 70.7, 70.7, 70.5, 70.2, 68.3, 61.9, 35.6, 33.5, 29.6, 29.2, 26.0, 22.4, 14.0.

Solution preparation—PVP was dissolved in ethanol at 18 wt. % with 0.05 wt. % NaCl and, for the photo-responsive fibers, 1.0 wt. % $C_4AzoC_6PEG_3$ was added. 5CB, a nematic LC, was used neat as the core solution for all experiments.

Electrospinning—Coaxial electrospinning was performed on a custom-built apparatus utilizing two New Era Syringe Pumps (NE-300). The syringe pumps were equipped with a 1 mL syringe containing the neat 5CB fixed with a coaxial needle (Ramé-Hart, inner Gauge 22/outer Gauge 12) and the other with a 12 mL syringe containing the polymer sheath solution connected to the outlet of the coaxial needle through Tygon tubing. The needle was set at distance of 14 cm away from the collector horizontally. The voltage between the needle and collector was set to 8.5-12.5 kV by a Matsusada high voltage power supply. The syringe pump flow rate was 0.5-2.5 $mL·hr^{-1}$ for the core and was held constant at 3.00 $mL·hr^1$ for the sheath solution. Fibers were collected onto aluminum foil, glass slide, or SEM post. Fibers were analyzed within 48 hours of spinning. Uniform, defect free, fibers were obtained after spinning in a fume hood at 18-23° C. and a relative humidity of 10-20%. Electrospinning outside of these parameters led to the formation of beaded fibers or fibers that varied significantly in morphology.

Polarized Optical Microscopy (POM)—Polarized optical microscopy was performed using a Zeiss Axio Imager 2 equipped with cross-polarizers. Images were taken using EC Epiplan-Neofluar 5-100× objectives and processed using Zen Core software (Zeiss, Oberkochen, Germany). Samples were prepared on glass slides and were analyzed in transmission mode under both polarized and 90° cross-polarized light. For experiments at varying temperatures, the microscope was equipped with a Linkam PE120 thermal stage, with which the temperature was controlled from room temperature to 37° C. at a rate of 1° $C.·min^{-1}$. Fiber dimensions were measured from POM images using Image J software (n≥50).

Viewing Mats Under Crossed Polarizers—Fibrous mats were viewed deposited onto a microscope slide, or as a neat swatch while backlit under crossed polarizers using a manual birefringence measurement system manufactured by the Photolastic division, Measurements group, Raleigh, North Carolina.

Photolysis—Samples were irradiated using an Omnicure Series 2000 from Lumen Dynamics with either 365, or 400-500 nm filters. The light was guided through a fiber optic cable and the samples were irradiated at distance of approximately 10 cm for less than 5 seconds. The irradiation intensity was 100 $mW·cm^{-2}$ for all experiments.

Scanning Electron Microscopy (SEM)—SEM was performed on a JEOL JSM-7600F field emission scanning electron microscope (Peabody, MA) operated at an accelerating voltage of 3 kV equipped. Samples were sputter-coated with least 3 nm gold prior to SEM analysis using a Cressington 108 autosputter coater equipped with an MTM20 thickness controller. ImageJ software was utilized to measure fiber sizes from the SEM images.

Focused Ion Beam-Scanning Electron Microscopy (FIB-SEM)—Fibers were milled with a FEI Helios focused ion beam scanning electron microscope. Immediately after milling, cross sectional scanning electron microscopy images of the fibers were acquired with the same FEI Helios system.

Preparation of electrospun fibers and the effect of fiber morphology on the interference color—Core-sheath nanofibers were fabricated using coaxial electrospinning (Ramé-Hart, inner Gauge 22/outer Gauge 12). A polymer sheath solution containing 18% PVP in ethanol with 0.05 wt. % NaCl was employed as the sheath solution and neat 5CB solution was used as the core solution. During these experiments, uniform, defect-free, fibers were obtained at an applied voltage of 8.5-12.5 kV, a collector distance of 14 cm, a relative humidity of 10-20%, and sheath and core flow rates of 3.0 and 0.25-1.75 mL·hr$^{-1}$ respectively. Fabrication outside of these parameters led to fibers with bead-like defects, or non-cylindrical morphologies. To fabricate uniform fibers with varying diameters, the core flow rate was varied between 0.25 and 1.75 mL·hr$^{-1}$ respectively while maintaining the other parameters as previously described. An illustration of the interference colors observed in the fibrous mats and individual fibers under linearly polarized light viewed with and without the addition of a polarizer rotated 90° relative to the incident light are shown FIGS. 8-12.

Figure 13:
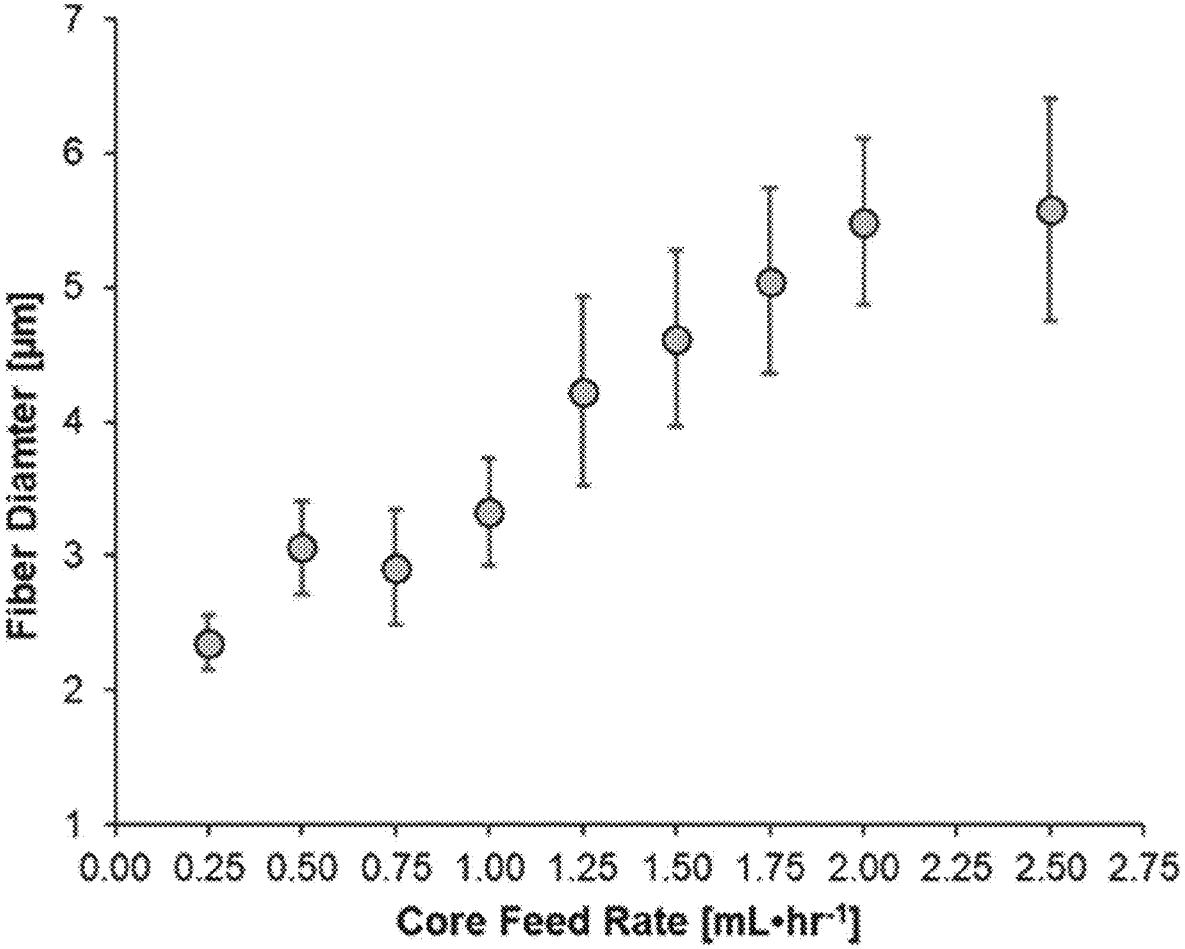
FIG. 13 shows measurement of fiber diameters with respect to core feed rate. Error bars are the result of n≥50 measurements.
Figure 14:
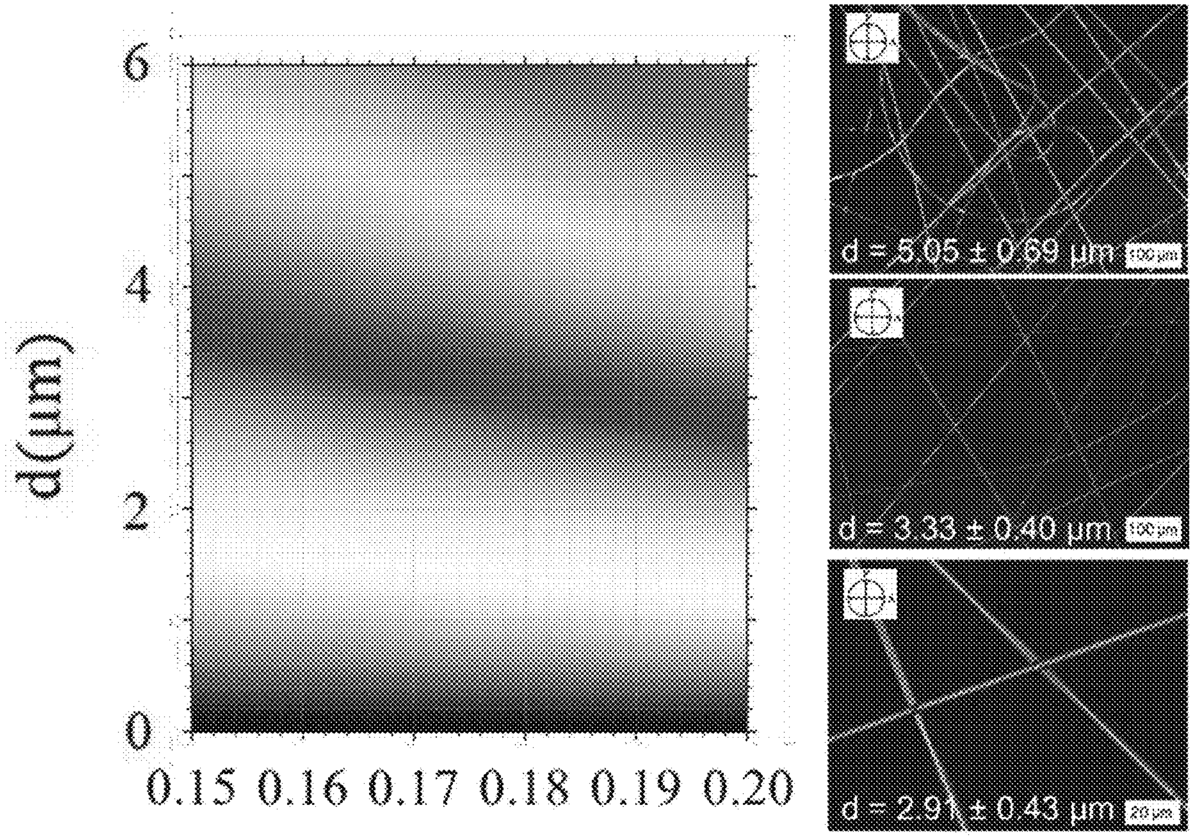
FIG. 14 shows a comparison of experimental and observed interference colors. The diameter of the fibers as measured as shown in the picture inset matches well with the predicted color on the interference color chart.

Electrospun nanofibers were fabricated at different diameters by varying the LC core flow rate between 0.25 and 2.5 mL·hr$^{-1}$. The diameter of the fibers was measured by analyzing polarized optical microscopy (POM) images using ImageJ software (n≥50). The diameter of the fibers increased with increasing core flow rate (FIG. 13). The diameter of the fibers varied between 2 and 7 μm with the smallest fibers, made at 0.25 mL·hr$^{-1}$, measuring 2.35±0.20 μm and the largest fibers, measuring 5.582±0.83 μm, observed at a core flow rate of 2.5 mL·hr$^{-1}$. The colors observed are consistent with the interference color chart shown in FIGS. 3A-B and 14. Fibers measuring less than 3 μm appeared white, yellow or orange under crossed polarizers corresponding to core flow rate less than 0.9 mL·hr$^{-1}$. At fiber diameters between 3 and 4 μm respectively, the fibers appeared magenta/purple (0.9-1.25 mL·hr$^{-1}$) and fibers appeared blue and green at diameters above 4 μm (1.25-1.75 mL·hr$^{-1}$).

Importantly, this represents a facile method of preparing fibers and fibrous mats showing drastically different interference colors by changing only a single parameter during the electrospinning process and, furthermore, demonstrates that the color differences are observable on a macro (mm) and micro (μm) scale. Therefore, changing the fiber diameter while maintaining uniform fiber morphology results in different interference colors as the increase in fiber diameter corresponds to an increase in the core diameter and thus, the thickness of the LC layer as it relates to the interference color chart. Using the interference color chart is a quick and accurate way of determining fiber diameter in nanofibers and fibrous mats with individual fiber diameters greater than 2 μm. On a macro-scale, the diameter of individual fibers in a non-woven mat can be estimated using the interference color chart.

Figure 9:
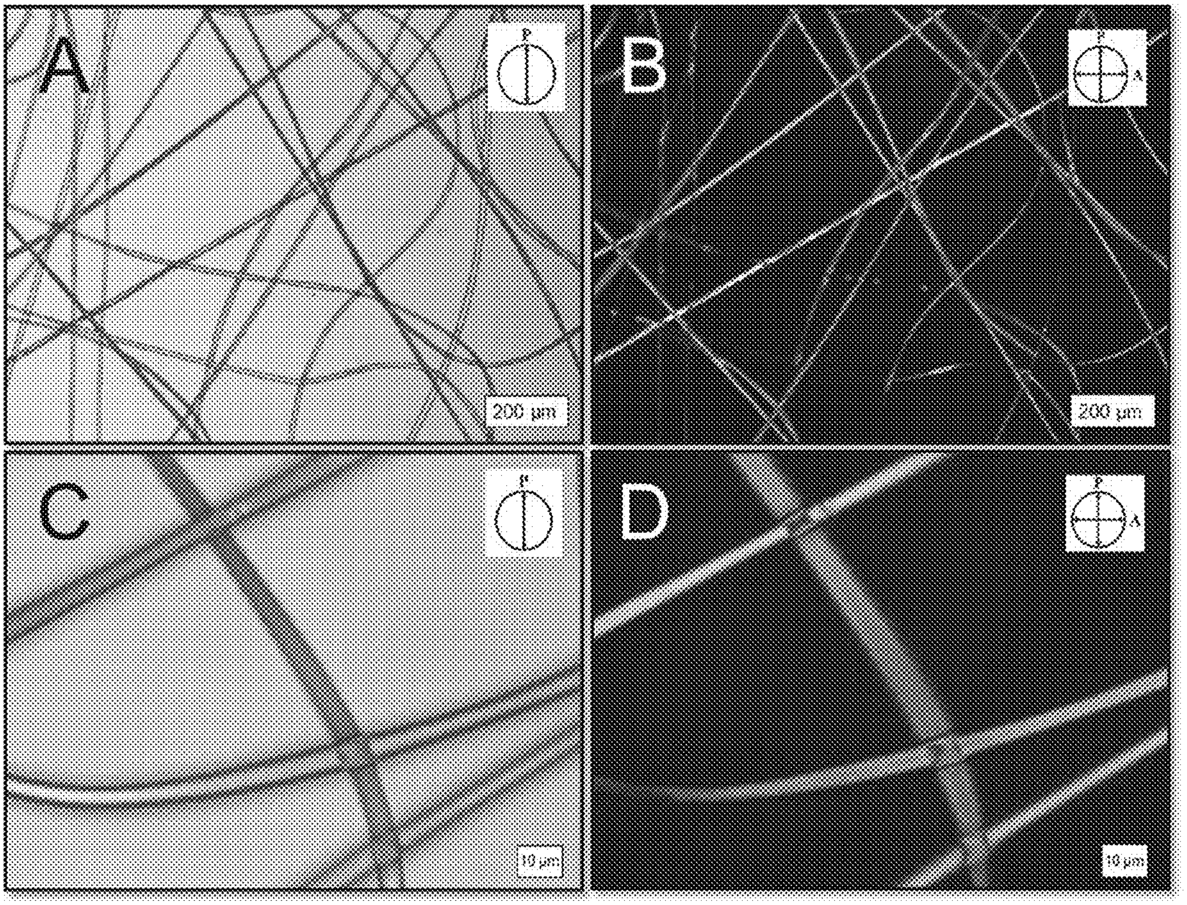
FIG. 9 shows electrospun fibers made with a core flow rate of 2.5 $mL \cdot hr^{-1}$. Images are shown in polarized transmission (A, C) and under crossed polarizers (B, D).
Figure 10:
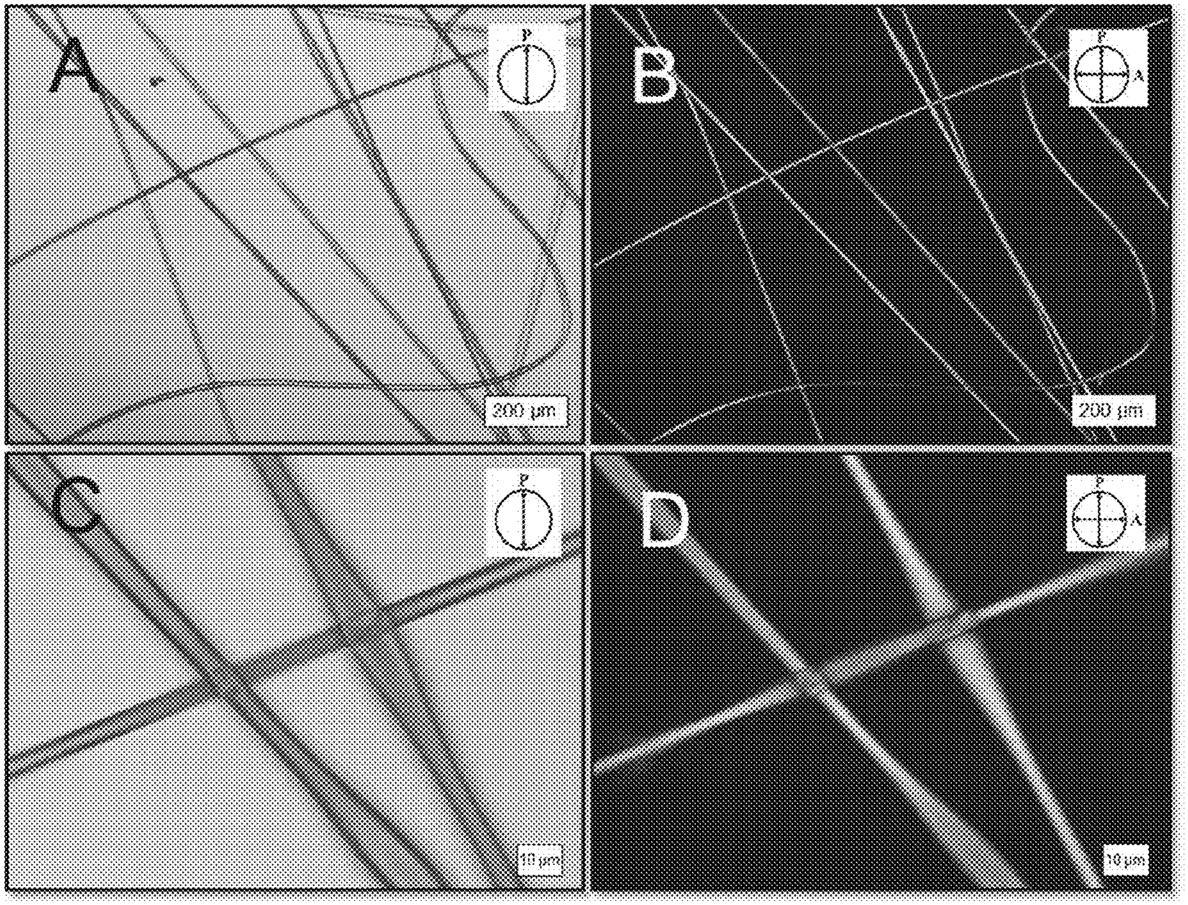
FIG. 10 shows electrospun fibers made with a core flow rate of 2.0 $mL \cdot hr^{-1}$. Images are shown in polarized transmission (A, C) and under crossed polarizers (B, D).
Figure 11:
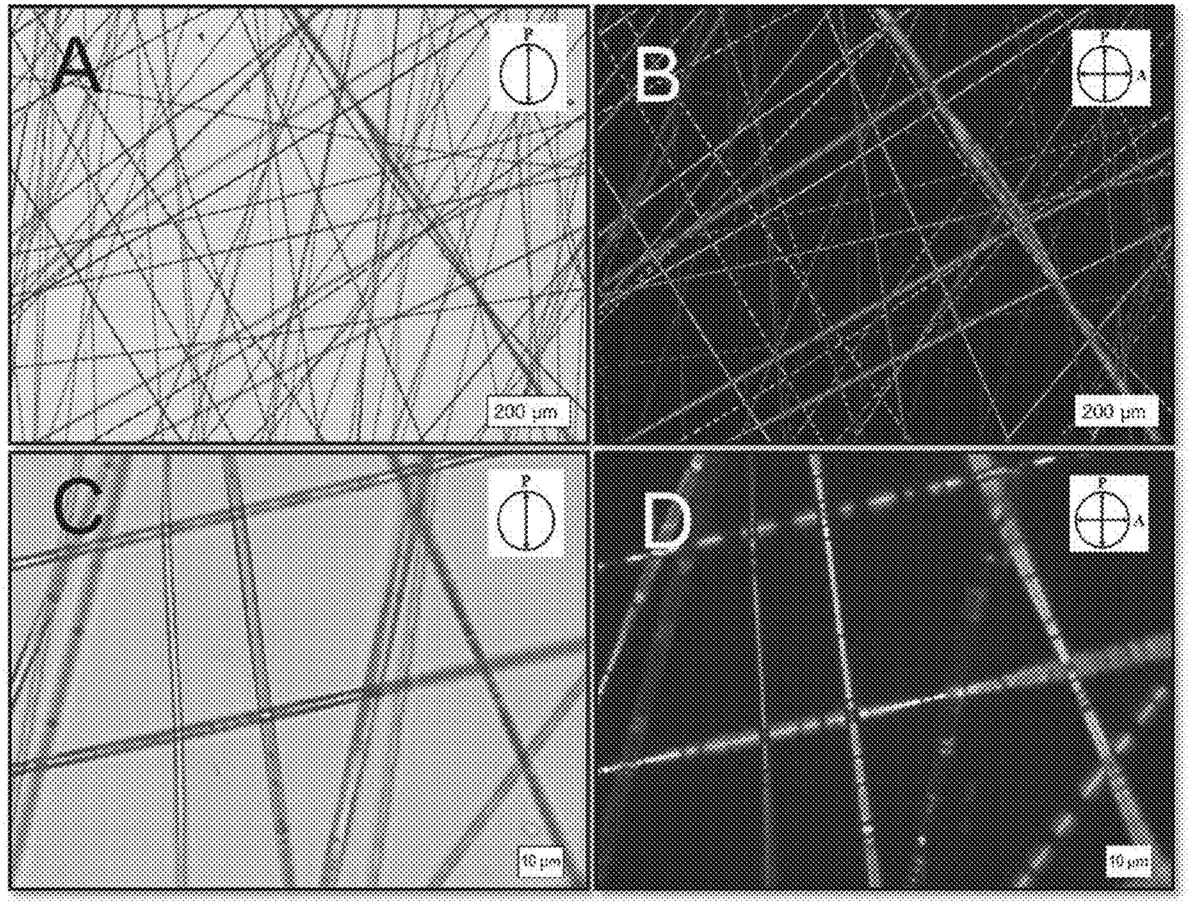
FIG. 11 shows electrospun fibers made with a core flow rate of 0.25 $mL \cdot hr^{-1}$. Images are shown in polarized transmission (A, C) and under crossed polarizers (B, D).
Figure 12:
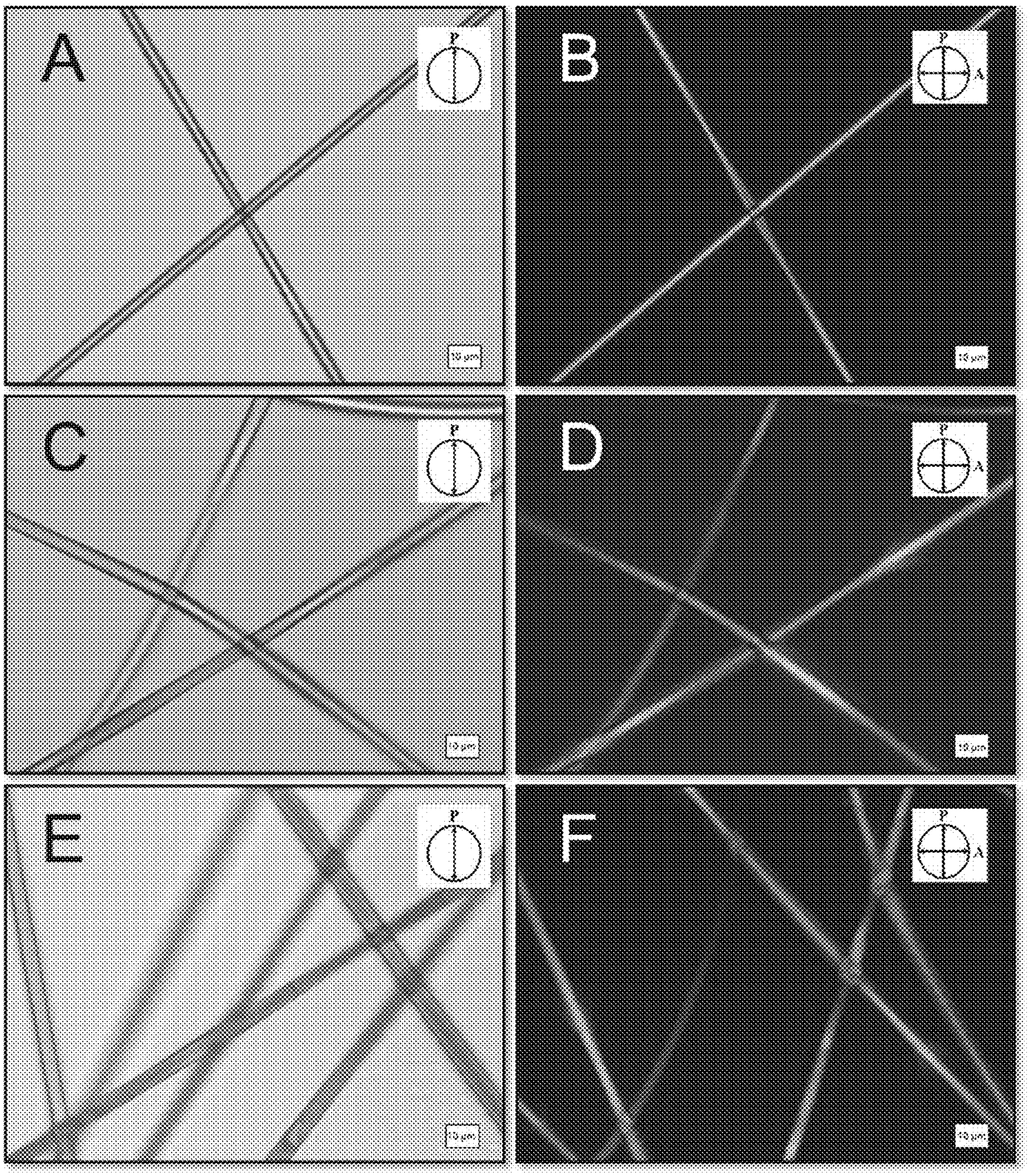
FIG. 12 shows electrospun fibers made with a core flow rate of 0.75 (A, B), 1.5 (C, D), and 1.75 (E, F) $mL \cdot hr^{-1}$ respectively. Images are shown in polarized transmission (A, C, E) and under crossed polarizers (B, D, F).

Because small changes in the core diameter can lead to large changes in the interference color(s) observed, maintaining uniform, cylindrical, fiber morphology is at the core of the ability to generate fibrous mats with strong observable color. This becomes challenging at core flow rates above 1.75 mL·hr$^{-1}$ where fiber diameter was not uniform across the sample leading to a mixture of colors when imaging single fibers and a fibrous mat appearing white when viewed under crossed polarizers (FIGS. 9-10). Uniform fibers were not able to be consistently fabricated at diameters greater than 6-7 μm, but fibers had visible pink, yellow and light blue color at the highest core feed rates of 2.0 and 2.5 mL·hr$^{-1}$ respectively. Similarly fibers spun at a core flow rate of 0.25 mL·hr$^{-1}$ were appeared with periodic white and black areas due to inconsistency in filling and fiber diameter too small (2.35±0.20 μm) to show bright interference colors (FIG. 11).

Figure 15:
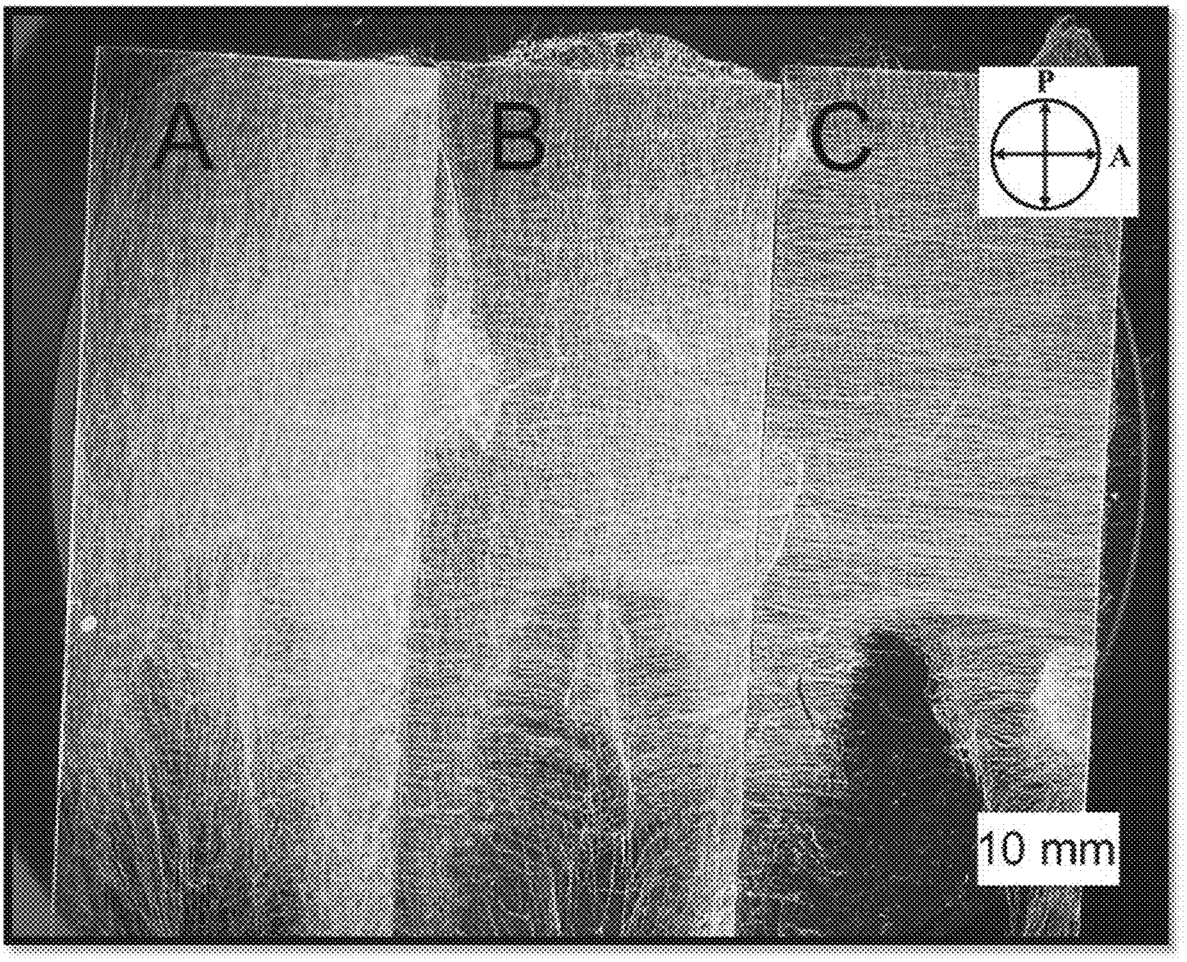
FIG. 15 shows electrospun nanofibrous mats made with core flow rates of 0.5 (A), 1.0 (B) and 1.5 (C) $mL \cdot hr^{-1}$ respectively and at a relative humidity of 35%. The fibrous mat appear dull due to the beading present in the fibers. The image is viewed under crossed polarizers.
Figure 16:
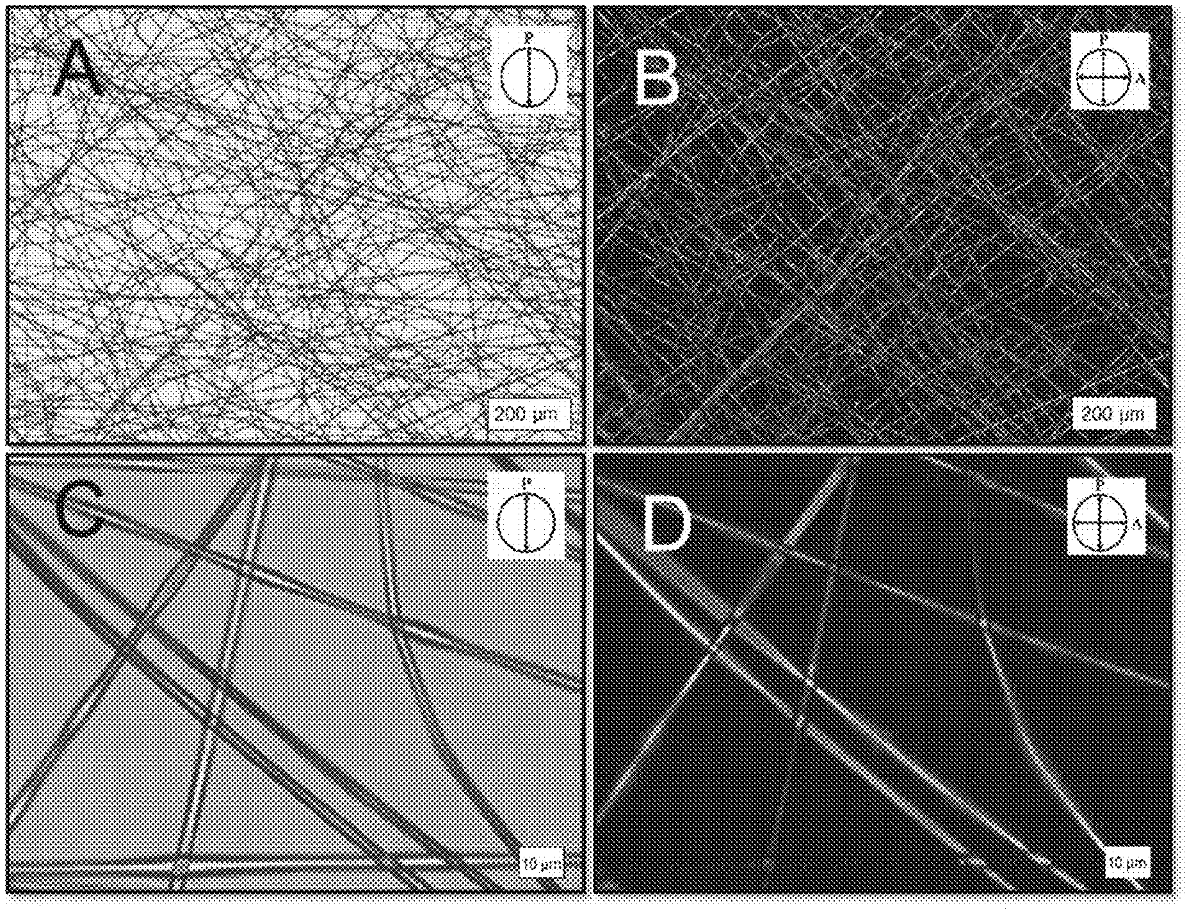
FIG. 16 shows electrospun fibers made with a core flow rate of 0.5 $mL \cdot hr^{-1}$ at a relative humidity of 35%. Images are shown in polarized transmission (A, C) and under crossed polarizers (B, D).
Figure 17:
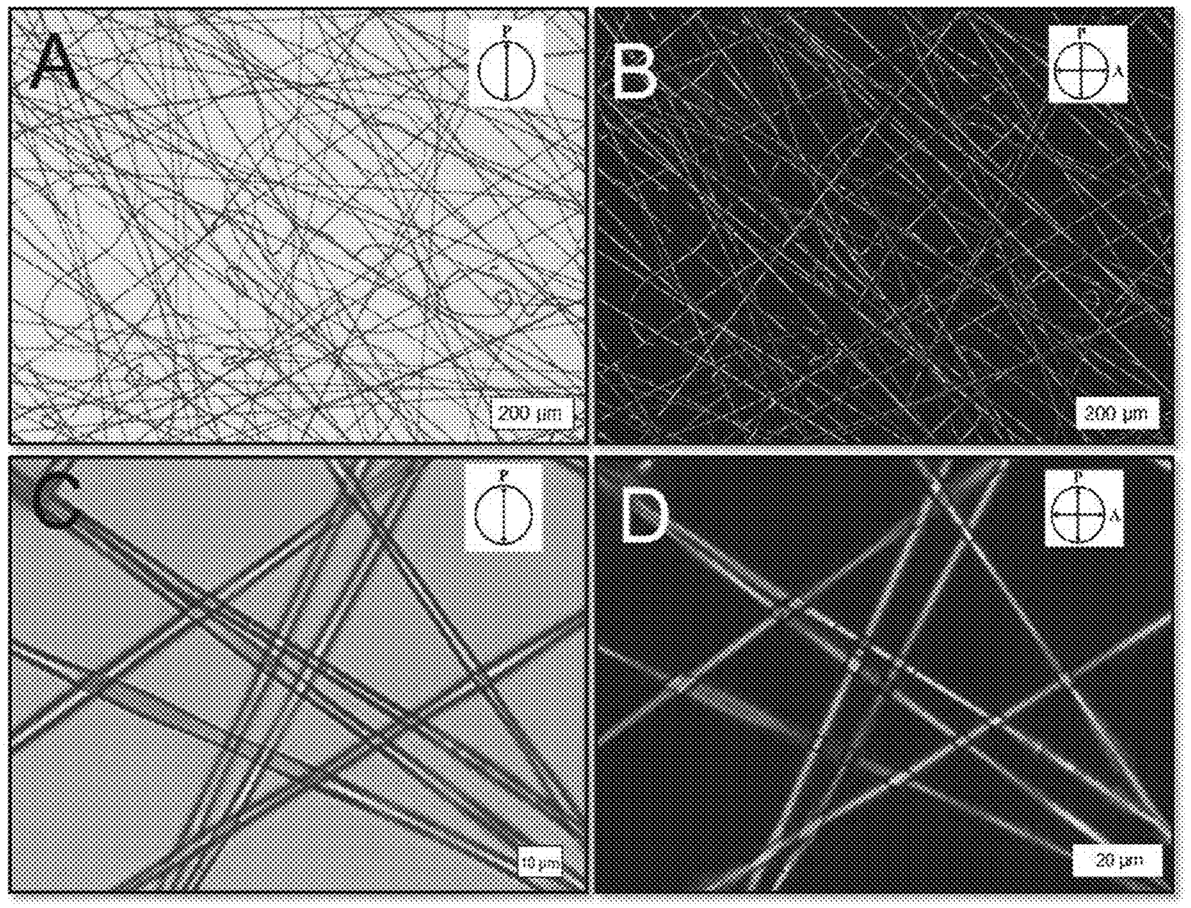
FIG. 17 shows electrospun fibers made with a core flow rate of 1.0 $mL \cdot hr^{-1}$ at a relative humidity of 35%. Images are shown in polarized transmission (A, C) and under crossed polarizers (B, D).
Figure 18:
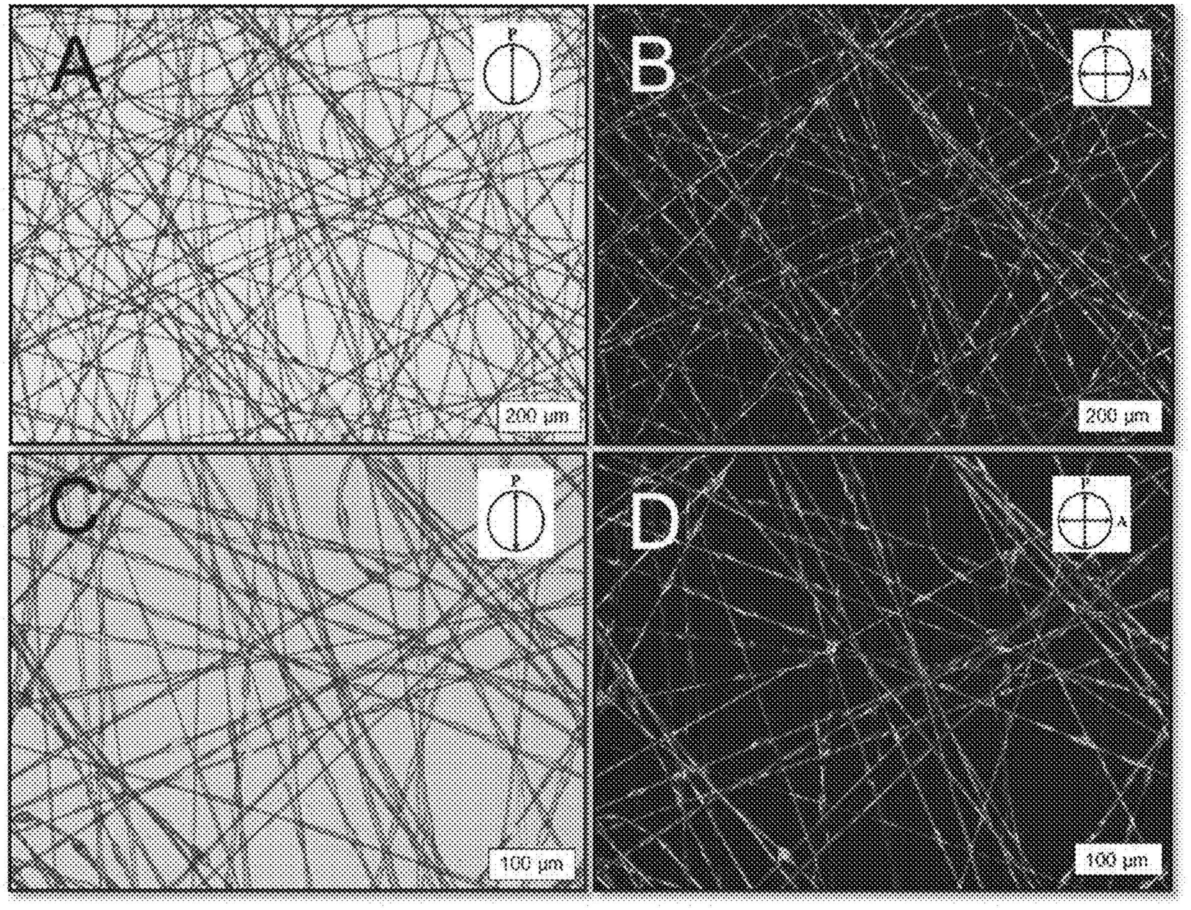
FIG. 18 shows electrospun fibers made with a core flow rate of 1.5 $mL \cdot hr^{-1}$ at a relative humidity of 35%. Images are shown in polarized transmission (A, C) and under crossed polarizers (B, D).
Figure 19:
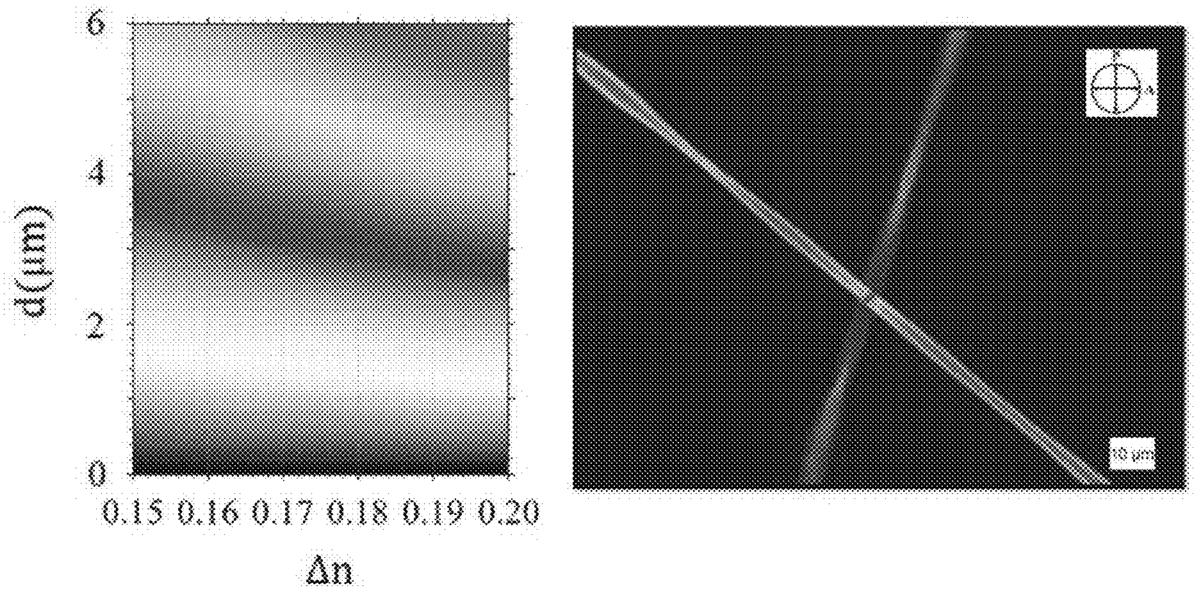
FIG. 19 shows a comparison of experimental and observed interference colors in beaded fibers. The periodic change in fiber diameter leads to a change in the interference color. The trends in the difference of color between the thicker (beads) and thinner areas in the fibers matches with the Raith-Sørensen chart. The fibers were electrospun at a core feed rate of 1.25 $mL \cdot hr^{-1}$ and a relative humidity of 35%.

Maintaining a relative humidity of less than 20% was also important in the fabrication of uniform, defect-free, fibers. As shown in FIGS. 15-18, samples electrospun at 35% relative humidity resulted in significantly beaded fibers at core flow rates above 0.5 mL·hr$^{-1}$. The periodic changes in fiber diameter due to beading result in a single fiber showing many observable interference colors under crossed polarizers. The dependence of the interference color and the importance of maintaining uniform fiber diameter when observing fibers and mats for interference colors is most notable when beaded fibers are formed. The periodic change in fiber diameter in beaded fibers show a corresponding color change that matches well with the interference color chart (FIG. 19). In the beaded fibers, thinner areas appear yellow or magenta while thicker areas appear dark or light blue. While the interference color of individual beaded fibers are clear and apparent on a micro-scale, the periodic variations in color do not translate to the macro-scale when viewing fibrous mats resulting in a dull, opaque interference color (FIG. 15).

Figure 20:
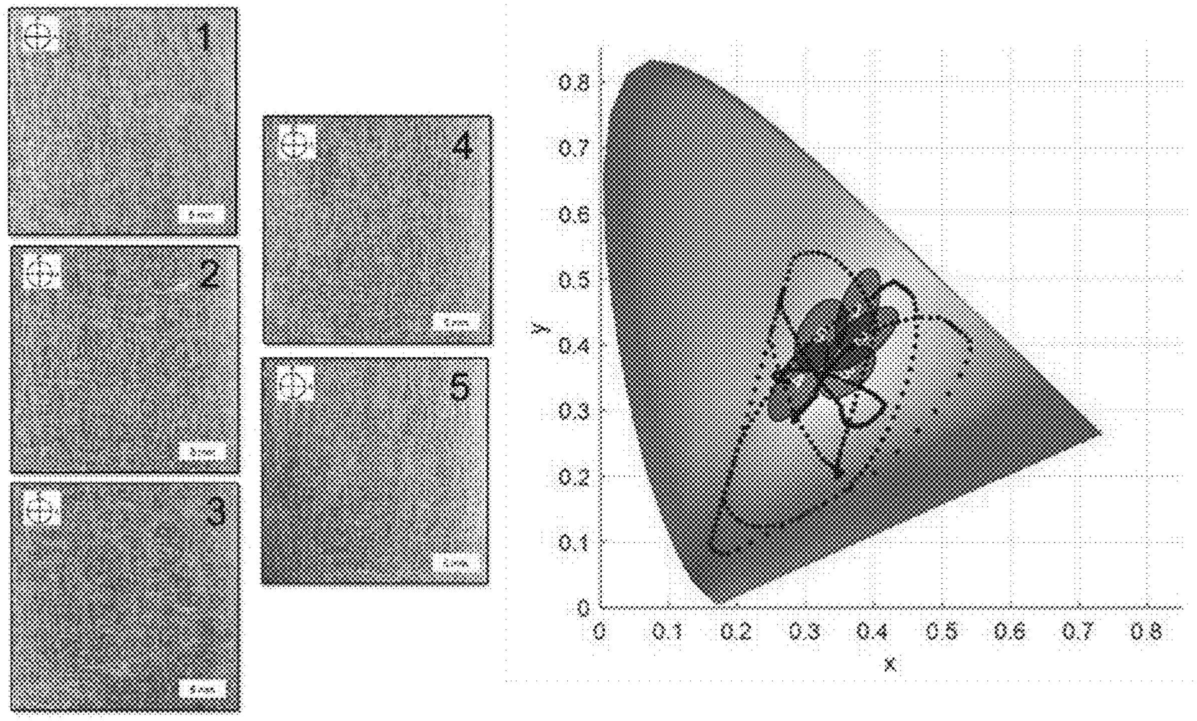
FIG. 20 shows a comparison between the measured interference colors of electrospun fibrous mats prepared with core feed rates of 0.5 (1), 0.75 (2), 1.0 (3), 1.5 (4) and 1.75 (5) $mL \cdot hr^{-1}$ respectively as mapped onto a CIE1931. The dotted line represents the possible colors according to the Raith-Sørensen chart in FIG. 3A.

In order to assess the scope of the color variability, the color quality of the fibrous mats was evaluated by mapping the colors on to a Commission Internationale de l'Eclairage (CIE) color plot (FIG. 20). Commonly used when evaluating LEDs, CIE color plots are a means of capturing the consistency, hue, and saturation of a light source. In this work, it helps to illustrate the uniformity, and consistency of the fibrous mat's interference color(s) as seen under crossed polarizers.

The dotted outline represents the possible color palate as outlined in the interference color chart in FIG. 3A. This determines the boundaries for possible colors as predicted by the interference color chart. The fibrous mats shown in FIG. 8 were evaluated by converting the image into a CIE XYZ color space coordinate using color sensitivity functions and mapped onto the CIE1931 color plot to describe the perceived color.

The colors measured are illustrated by a circle representing the total population of colors observed in the fibrous mat. Interestingly, there was little overlap between the measured color(s) of the fibrous mats demonstrating the uniformity of colors on a macro-scale. However, all of the colors evaluated demonstrated high saturation of white light, most likely due to a high degree of scattering from the fibrous mat. While electrospinning, no attempt was made to align the fibers during the collection process which may significantly impact the scattering properties of the fibrous mats. Nonetheless, chromaticity characterization of the fibrous mats demonstrates the drastic effect a small change in the core flow rate can have on the interference color of the nanofibers.

Figure 21:
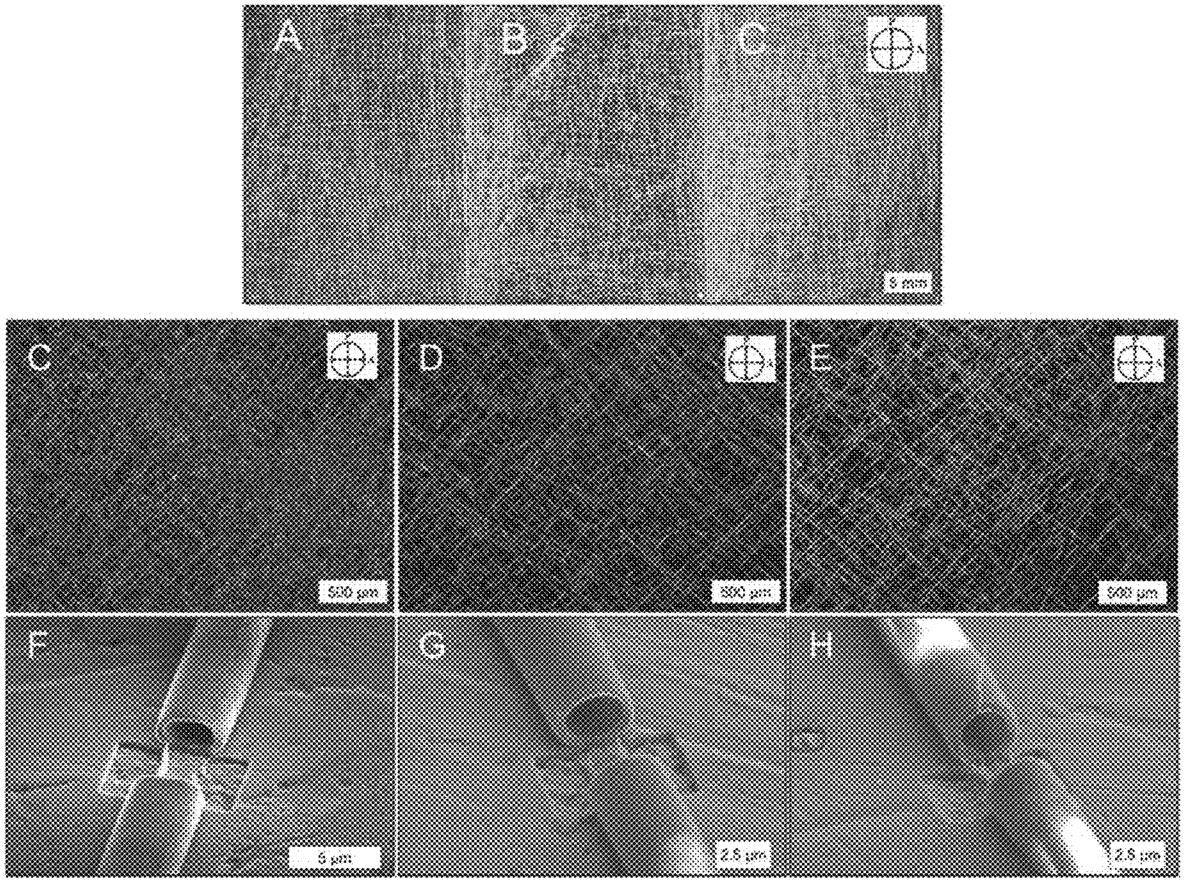
FIG. 21 shows electrospun nanofibers fabricated with core flow rates of 1.5 (A, C, F), 0.9 (B, D, G) and 0.5 (C, E, H) $mL \cdot hr^{-1}$. Fibrous mats appear yellow, orange/red and blue on a macro-scale viewed under crossed polarized (A-C). Using POM, individual fibers show uniform color with small deviations present in the sample manufactured at 1.5 $mL \cdot hr^{-1}$ (C) which appear magenta most likely due to a small population of fibers with a smaller core diameter. Additionally, core-sheath morphology and relative core and sheath diameters are observed using FIB-SEM (F-H). Fibers fabricated at a lower core flow rate have a smaller core diameter, but core sheath morphology was maintained regardless of the core flow rate tested here.

Imaging the nanofiber core with FIB-SEM—The effect of increasing the core flow rate on the diameter of the LC core was further investigated by milling out sections of fibers manufactured at difference core flow rates using a focused ion beam and imaging the fiber cores with SEM (FIG. 21). Fibers were prepared at core flow rates of 0.5, 0.9 and 1.5 mL·hr$^{-1}$ respectively and, under crossed polarizers, the macro-scale fibrous mats were imaged along with individual fibers to show the interference color(s). Fabrication resulted in yellow, red/orange, and blue fibers with no observable defects. Images of the core taken with FIB-SEM show the thickness of the polymer sheath is maintained with increasing core flow rate. This is unsurprising considering the sheath flow rate was maintained throughout the experiments, however, FIB-SEM clearly shows the core fiber diameter increases (FIG. 21).

Figure 22:
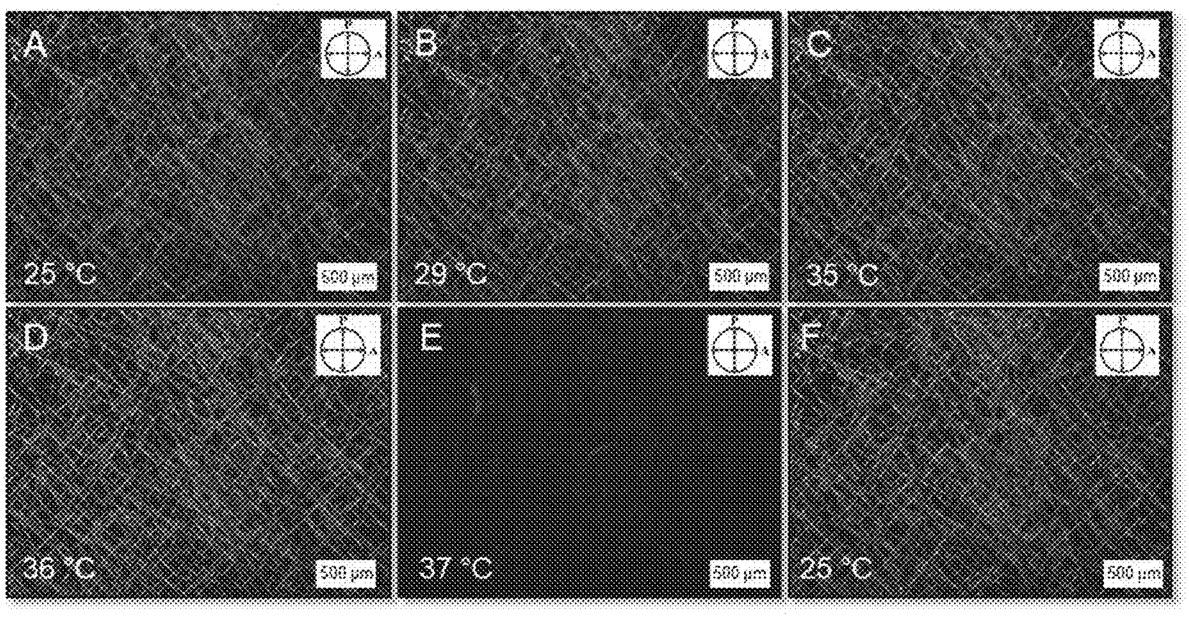
FIG. 22 shows POM images showing the thermochromic behavior of electrospun nanofibers with heating. Fibers shown were manufactured with a core flow rate of 1.5 $mL \cdot hr^{-1}$. Initially the fibers appear dominantly blue (A), but transition through magenta (29° C., B), orange (35° C., C) and yellow (36° C., D) before all birefringence is lost (37° C., E). Upon cooling, (25° C., F) the system returns to the original blue color.

Thermochromic response—To examine the effect of heating on the interference color(s) of 5CB-core electrospun nanofibers, samples were analyzed by POM under crossed polarizers while the fibers were heated at a rate of 1° C.·min$^{-1}$ using a thermal stage. An example of a heating ramp with fibers showing a blue-dominant interference color made with a core flow rate of 1.5 mL·hr$^{-1}$ is shown in FIG. 22.

Figure 23:
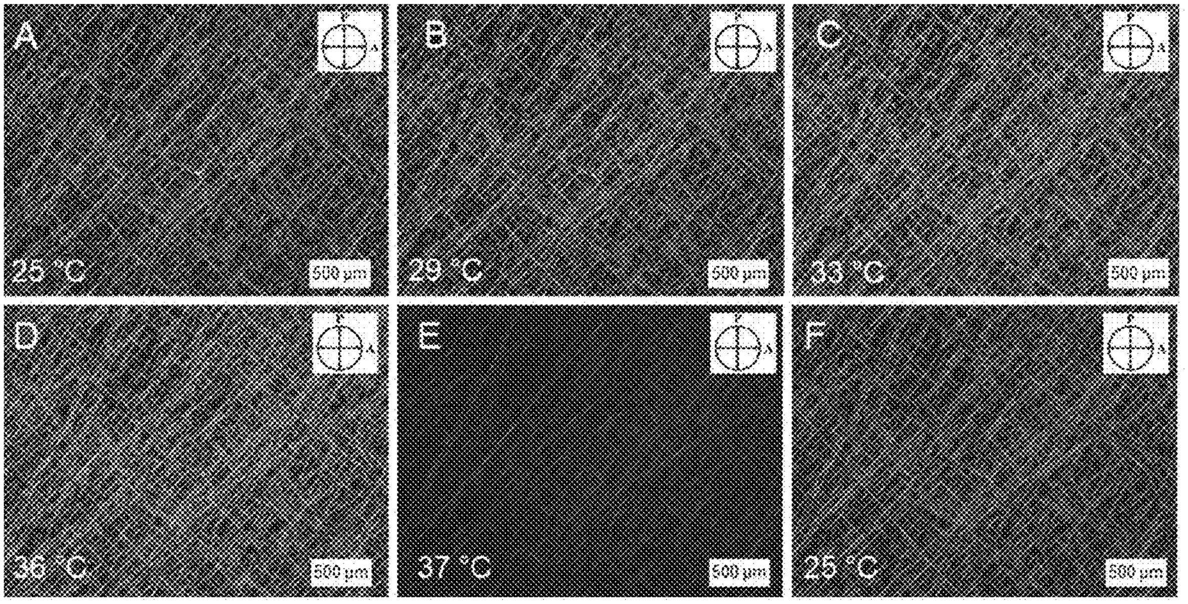
FIG. 23 shows POM images showing the thermochromic behavior of electrospun nanofibers with heating. Fibers shown were manufactured with a core flow rate of 1.0 $mL \cdot hr^{-1}$. Initially the fibers appear dominantly orange/red (A), but transition through orange (29° C., B), yellow (33° C., C) and white (36° C., D) before all birefringence is lost (37° C., E). Upon cooling, (25° C., F) the system returns to the original orange/red color.

As the sample is heated, the interference color begins to shift from blue to magenta at 29° C. before becoming orange/yellow before the LC core becomes nematic at temperatures above 37° C. The blue-dominant color returns after cooling the sample back to room temperature this demonstrating the reversibility of the color change (FIG. 22, panel F). Similar behavior can be seen when heating a sample made at a lower core flow rate of 1.0 $mL\cdot hr^{-1}$ (FIG. 23). The reversible color change is demonstrated as the fibers initially appear red/orange before transitioning to yellow, and finally white, before the nematic to isotropic transition above 37° C. and return to the original color after cooling. The same behavior can be observed on a macro-scale in fibrous mats.

With increasing temperature, the long-range order is disrupted until reaching a point ($T_{N\rightarrow I}$) at which the LC becomes isotropic. This loss of birefringence as the sample is slowly heated and the LC core becomes more disordered causes the interference color to change with the change in birefringence. Therefore, there are multiple ways to change the interference color according to the color chart in FIGS. 3A-B. With an increase in fiber diameter due to an increasing LC core flow rate, the thickness of the LC core changes, thus moving along the y-axis in the color chart. However, with heating, the fiber morphology remains unchanged, but the long range order, and thus the birefringence, decreases with increasing temperature. This is akin to moving along the x-axis of the interference color chart as the birefringence decreases. Together with the ability to modulate the fiber diameter a dynamic system is achieved where the interference color of the nanofibrous mats are able to be controlled reversibly, and with multiple stimuli across a wide range of observable colors.

Photochemical response—Azobenzene-based dyes are among the most common photochromic compounds used in combination with liquid crystals to modulate their phase behavior.[41] Azo dyes switch from a rod-shaped trans isomer to a bent-shaped cis isomer with UV irradiation. Irradiation of the cis isomer (commonly with visible light) causes reverse isomerization allowing for the system to reversibly switch between isomers using UV and visible light. The trans isomer is broadly compatible with the LC mesophase and does not significantly disrupt long-range order in nematic LCs. However, the bent-shaped cis isomer disrupts the long-range order which leads to the depression in temperature of all LC related phase transitions in the presence of cis azo dyes. Thus, the change in LC behavior, but by changing the phase diagram.[42-49]

The amount of azo dye incorporated in the LC matrix has a direct effect on its ability to affect the long-range order of the LC mesophase.[31, 32, 47] Previously, most work has focused on dropping the nematic to isotropic transition temperature below room temperature so the phase transitions can be triggered with light, however, this work aims not to change the phase of the LC, rather to disrupt the long-range order enough so that the change in birefringence leads to a change in the interference color of the LC-core fibers. Similarly to the previously demonstrated thermal control, according to the Raith-Sørensen chart in FIGS. 3A-B, lowering the birefringence of the LC core while still maintaining some degree of long-range order will result in a change in the interference color of the LC fibers.

Figure 24:
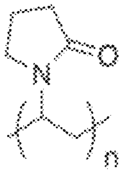
FIG. 24 shows the structure and properties of example compounds.
Figure 24:
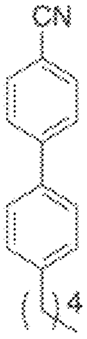
Figure 24:
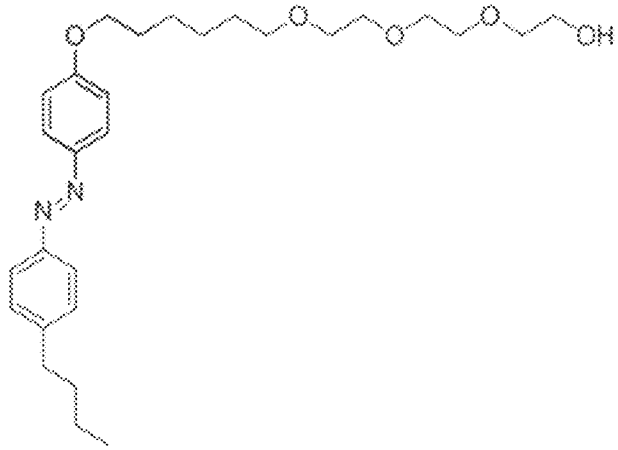

Previous work investigated the addition of a photochromic azobenzene-based surfactant, $C_4AzoC_6PEG_3$ (FIG. 24), into the polymer sheath of core/sheath nanofibers with a nematic LC core.[32] In doing so, the phase and alignment control of the LC core was photochemically controllable. At 3.0 wt. % of $C_4AzoC_6PEG_3$, the transition temperature was dropped significantly below room temperature, however, at concentrations less than 1.5 wt. % $C_4AzoC_6PEG_3$, the transition temperature was slightly depressed, but POM images showed a disruption of the long-range order of the LC core with UV irradiation.

Figure 25:
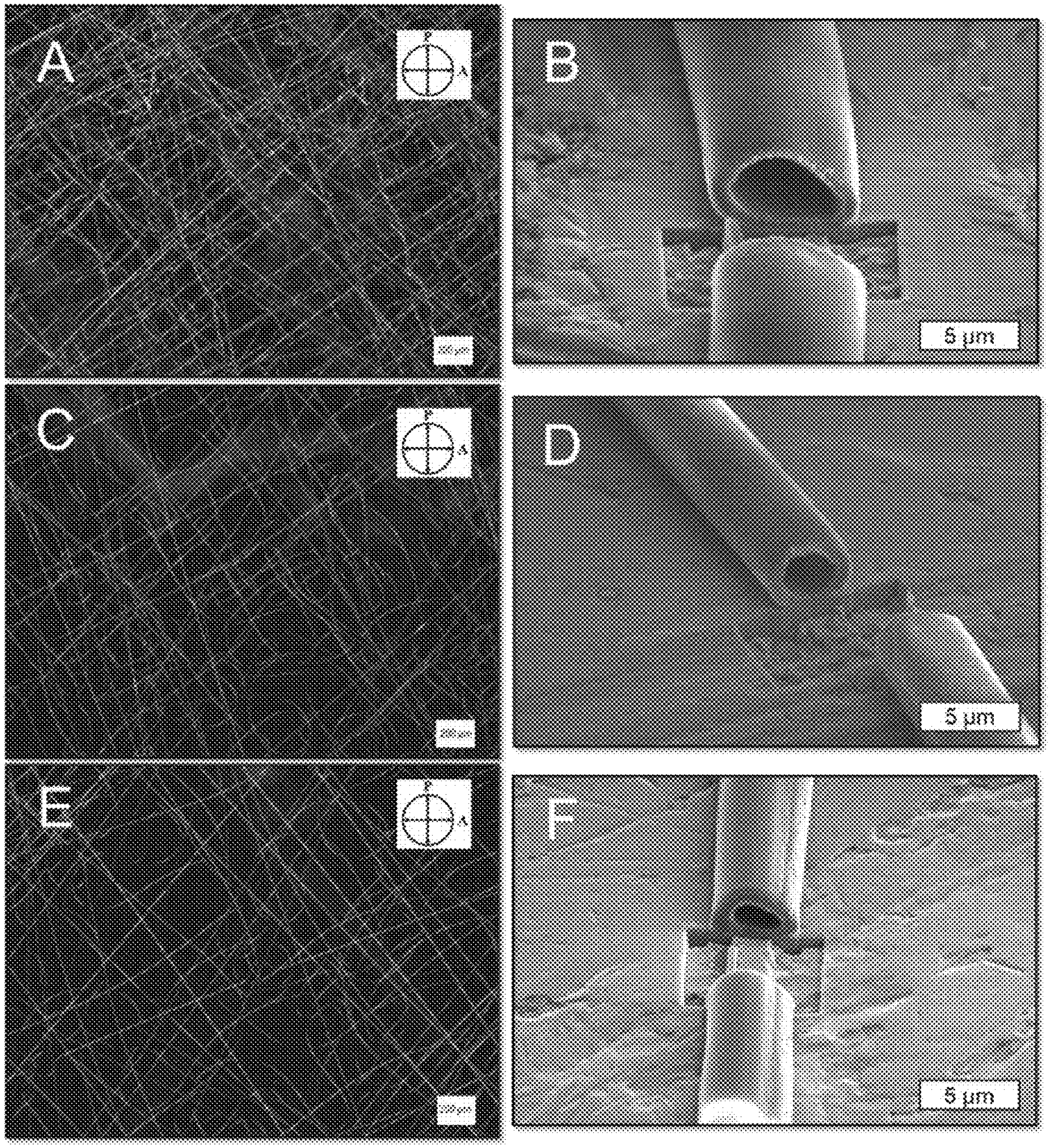
FIG. 25 shows POM and FIB-SEM images of electrospun fibers made with core feed rates of 0.5 (A, B), 1.0 (C, D) and 1.5 (E, F) $mL \cdot hr^{-1}$ respectively. All fibers were made with a polymer solution containing 1.0 wt % $C_4AzoC_6PEG_3$. Fibers are brightly birefringent with district interference colors. Images of the core taken with FIB-SEM show a clear core/sheath morphology.

Based on the previous work, photochemically responsive fibers were fabricated with monomer solutions containing 18 wt. % PVP, 0.05 wt. % NaCl, and 1.0 wt. % $C_4AzoC_6PEG_3$ in EtOH to be used as the sheath, and neat 5CB was used as the core. The sheath flow rate was held constant at 3.0 $mL\cdot hr^{-1}$, the collector distance was set to 14 cm and the applied voltage was set between 8.5 and 12.5 kV. At 1.0 wt. % $C_4AzoC_6PEG_3$, photoisomerization of the azo-surfactant is expected to minimally affect the phase behavior of the LC core, but disrupt the long-range order (i.e. birefringence) significantly enough to change the interference color. Fibers were spun at core feed rates of 0.5, 1.0, 1.5 and 2.0 $mL\cdot hr^{-1}$ respectively and the fibers were analyzed by POM and FIB-SEM (FIG. 25).

With the exception of 2.0 $mL\cdot hr^{-1}$ uniform fibers were obtained with bright interference colors and fiber diameters of 2.43±0.35, 3.32±0.35, 5.08±0.88, and 5.83±1.03 μm for core feed rates of 0.5, 1.0, 1.5, and 2.0 $mL\cdot hr^{-1}$ respectively. The addition of 1.0 wt. % of $C_4AzoC_6PEG_3$ to the polymer sheath had a negligible effect on the fiber diameter when compared with fibers made without $C_4AzoC_6PEG_3$. The interference colors observed for the uniform fibers matched well with the predicted colors form the interference color chart in FIGS. 3A-B. Fibers made at 0.5, 1.0 and 1.5 $mL\cdot hr^{-1}$ appeared orange, magenta, and blue/green respectively. At core feed rates greater than 0.5 $mL\cdot hr^{-1}$, there are deviations in the fiber diameter within a single sample with orange and blue fibers being visible in the sample made at 1.0 $mL\cdot hr^{-1}$, and blue, pink and white fibers being visible in the sample at 1.5 $mL\cdot hr^{-1}$ suggesting that the presence of $C_4AzoC_6PEG_3$ leads to the production of fibers with a broader distribution of fiber diameters when compared to samples made without the surfactant. At 2.0 $mL\cdot hr^{-1}$ fibers appeared green, pink and white with no dominant color due to the presence of beads and general deviations in fiber morphology. Images of the core/sheath morphology taken using FIB-SEM show a distinct core and cylindrical morphology similar to fibers made in the absence of $C_4AzoC_6PEG_3$ suggesting there was no disruption of core/sheath morphology due to diffusion of the surfactant into the polymer sheath during the electrospinning process.

Figure 26:
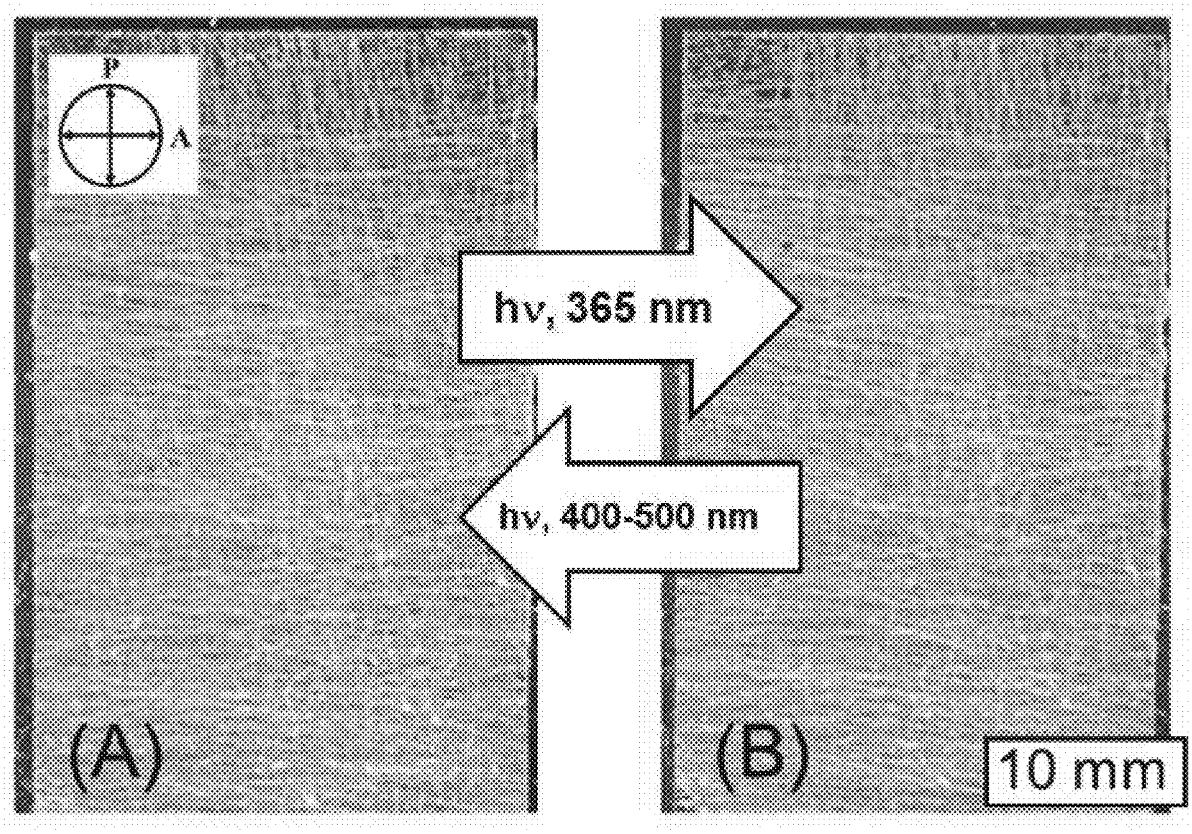
FIG. 26 shows a fibrous mat viewed under polarizers made at a core flow rate of 1.0 $mL \cdot hr^{-1}$ with 1.0 wt % $C_4AzoC_6PEG_3$ in the polymer sheath solution. Initially, the mat appears magenta (A), but irradiation at room temperature with 365 nm light causes the interference color to become yellow (B). Irradiation with visible (400-500 nm) light causes the system to return to its original state.

To photochemically initiate a change in the interference color, fibrous mats made with core feed rates of 0.5, 1.0, and 1.5 $mL\cdot hr^{-1}$ were irradiated with 365 nm light for 10 seconds. FIG. 26 shows the change in the interference color of a fibrous mat made with a core feed rate of 1.0 $mL\cdot hr^{-1}$. Before irradiation the mat appears magenta under crossed polarizers, but after irradiation the mat becomes yellow. This color change is persistent and did not fade after more than two hours in room light at room temperature. After UV, irradiation at 400-500 nm light causes the magenta color to return highlighting the reversibility of the color change and demonstrating that the color change is due to the photoisomerization of $C_4AzoC_6PEG_3$. The behavior also agrees with the interference color chart in FIGS. 3A-B. Starting with magenta, a decrease in birefringence to lead to a yellow interference color would be expected.

Figure 27:
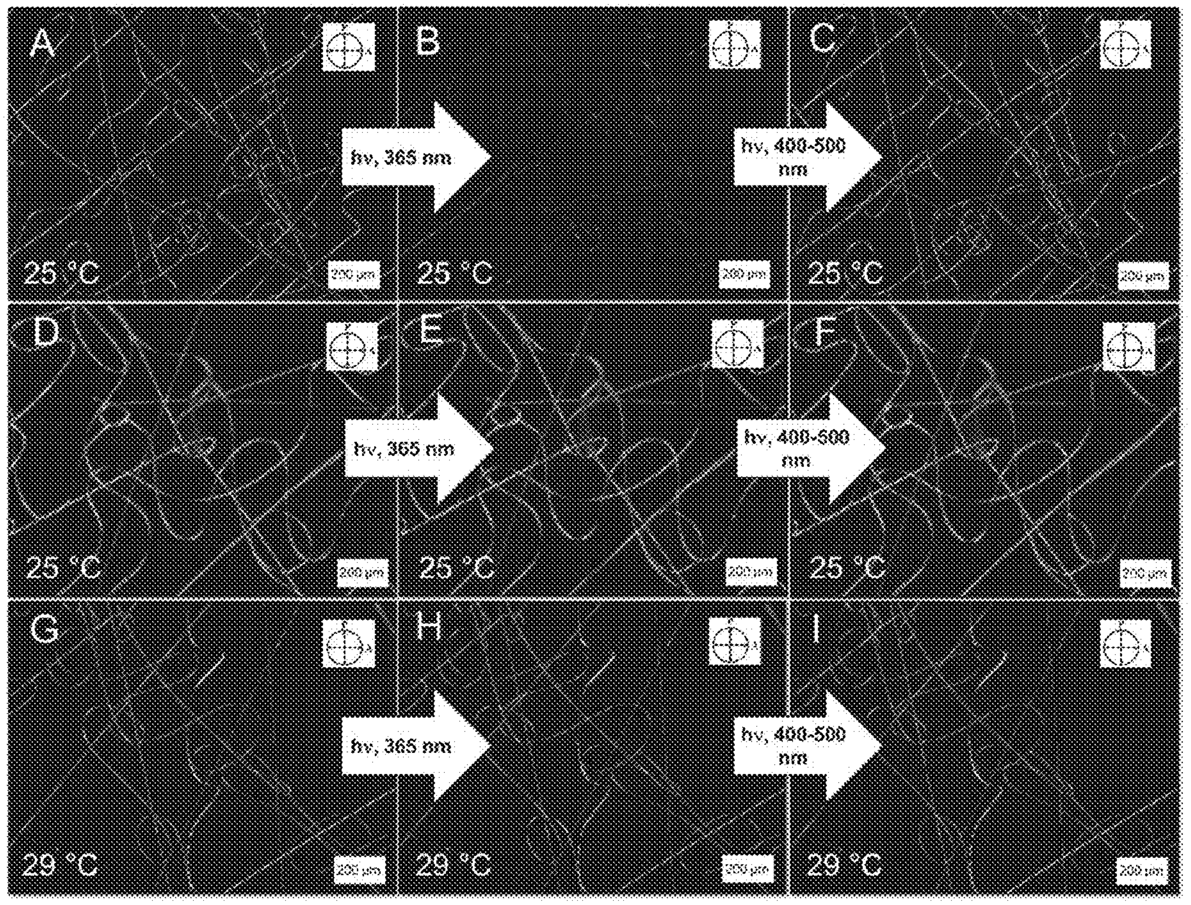
FIG. 27 shows irradiation of electrospun nanofibers made with 1.0 wt % $C_4AzoC_6PEG_3$ and core flow rates of 0.5 $mL \cdot hr^{-1}$ (A-C) and 1.5 $mL \cdot hr^{-1}$ (D-F, G-I). At core a core rate of 0.5 $mL \cdot hr^{-1}$, UV irradiation causes the LC core to become almost non-birefringent (A-B) with visible light irradiation reversing the LC phase change. With larger fibers made at a core flow rate of 1.5 $mL \cdot hr^{-1}$, UV/Vis irradiation at room temperature has a negligible effect on the phase, or interference color, of the nanofibers. However, heating the sample to 29° C. allows UV irradiation to change the interference color from blue to magenta/orange and visible light irradiation to return the system to its initial state (G-I).

There was a significant fiber-diameter dependence on the behavior of the nanofibers under UV irradiation. Irradiation of fibers with a smaller diameter had a larger effect on the optical properties of the LC core while, at room temperature, larger fibers were unaffected. Examples of fibers made with 0.5 $mL\cdot hr^{-1}$ and 1.5 $mL\cdot hr^{-1}$ are shown in FIG. 27. Fibers made with a core feed rate of 2.0 $mL\cdot hr^{-1}$ were not tested due to their lack of uniform morphology and distinct interference color.

At 0.5 $mL\cdot hr^{-1}$, UV irradiation caused the sample to change from yellow/orange to white/non-birefringent and was reversible with visible irradiation (FIG. 27, panels A-C). Similar to previously results, this "on"/"off" behavior is due to a drop in the nematic to isotropic transition temperature below room temperature with the cis isomer of $C_4AzoC_6PEG_3$ disrupting surface anchoring and leading to a random oriented LC core.[32] At 1.5 mL·hr$^{-1}$, there was no noticeable color change at room temperature suggesting that the decrease in birefringence caused by the presence of $C_4AzoC_6PEG_3$ was not great enough in change the interference color at room temperature (FIG. 27, panels D-F), however UV irradiation was able to induce color change at elevated temperatures (FIG. 27, panels D-E, G-I). At elevated temperatures, the LC core becomes less birefringent as the LC mesophase becomes less ordered. For fibers with a larger diameter made at 1.5 mL·hr$^{-1}$ the effect of the photochemically-induced disorder caused by the photoisomerization of $C_4AzoC_6PEG_3$ in the polymer sheath is amplified at elevated temperatures, allowing for both thermal and photochemical control over the interference color of the nanofibers and nanofibrous mats.

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

REFERENCES

1. Teyssier et al., *Nat Commun,* 2015, 6, 6368
2. Burford et al., *Proc Natl Acad Sci USA,* 2020, 117, 8524-8531
3. Schwartz et al., *Adv Mater,* 2018, 30, e1707382
4. Roach et al., *ACS Appl Mater Interfaces,* 2019, 11, 19514-19521
5. Ohzono et al., *Advanced Materials Interfaces,* 2020, 7
6. Geng et al., *Advanced Functional Materials,* 2021, 31
7. Yang et al., *Adv Mater,* 2021, 33, e2006361
8. Lin et al., *Opt Express,* 2016, 24, 3112-3126
9. Kizhakidathazhath et al., *Advanced Functional Materials,* 2019, 30
10. Kim et al., *Chemphotochem,* 2019, 3, 284-303
11. Zhang et al., *ACS Appl Mater Interfaces,* 2021, 13, 3153-3160
12. Pieraccini et al., *Chem Soc Rev,* 2011, 40, 258-271
13. Toney et al., *Nature,* 1995, 374, 709-711
14. Kuang et al., *ACS Appl Mater Inter,* 2018, 10, 27269-27277
15. Ichimura, *Chem Rev,* 2000, 100, 1847-1874
16. Pan et al., *J Biol Phys,* 2003, 29, 335-338
17. Li et al., *J Disp Technol,* 2005, 1, 51-61
18. Sørensen, *European Journal of Mineralogy,* 2013, 25, 5-10
19. Bauer, 2017
20. Zou et al., *Optics Express,* 2011, 19, 3297-3303
21. Zhao et al., *J Am Chem Soc,* 2007, 129, 764-765
22. Chen et al., *Langmuir,* 2010, 26, 11291-11296
23. Han et al., *ACS Appl Mater Interfaces,* 2013, 5, 8241-8245
24. Kye et al., *Journal of Materials Chemistry C,* 2015, 3, 8979-8985
25. Lagerwall et al., *Chem Commun (Camb),* 2008, 5420-5422
26. Enz et al., *Beilstein J Org Chem,* 2009, 5, 58
27. Chien et al., presented in part at the Emerging Liquid Crystal Technologies VII, 2012
28. Urbanski et al., *J Phys Condens Matter,* 2017, 29, 133003
29. Bertocchi et al., *The Journal of Physical Chemistry C,* 2018, 122, 16964-16973
30. Dicker et al., *Langmuir,* 2020, 36, 7916-7924
31. Thum et al., *ACS Applied Nano Materials,* 2021, 4, 297-304
32. Thum et al., *Journal of Materials Chemistry C,* 2021, 12859
33. Enz et al., *Journal of Materials Chemistry,* 2010, 20
34. Reyes et al., *Liquid Crystals,* 2016, 43, 1986-2001
35. Pschyklenk et al., *ACS Applied Polymer Materials,* 2020, 2, 1925-1932
36. Nguyen et al., *Polymers (Basel),* 2020, 12
37. Nasajpour et al., *ACS Mater Lett,* 2020, 2, 1067-1073
38. Reyes et al., *ACS Appl Mater Interfaces,* 2020, 12, 26566-26576
39. Xue et al., *Chem Rev,* 2019, 119, 5298-5415
40. Bertocchi et al., *J Phys Chem C,* 2018, 122, 16964-16973
41. Bisoyi et al., *Chem Rev,* 2016, 116, 15089-15166
42. Ikeda et al., *J Phys Chem-Us,* 1991, 95, 509-511
43. Ikeda et al., *Science,* 1995, 268, 1873-1875
44. Tsutsumi et al., *Journal of Physical Chemistry B.,* 1998, 102, 5
45. Tsutsumi et al., *Phys Chem Chem Phys,* 1999, 1, 5
46. Sung et al., *Chemistry of Materials,* 2002, 14, 385-391
47. Garcia-Amoros et al., *Phys Chem Chem Phys,* 2009, 11, 4244-4250
48. Garcia-Amoros et al., *Beilstein J Org Chem,* 2012, 8, 1003-1017
49. Garcia-Amoros et al., *Phys Chem Chem Phys,* 2018, 20, 1286-1292

What is claimed is:

1. A fiber comprising:
a sheath comprising a polymer;
wherein the sheath is transparent to visible light; and
a core comprising a non-cholesteric liquid crystal;
wherein the fiber has an average diameter of no more than 10 microns; and
wherein at least 90% of the fiber has a diameter within 20% of the average diameter.

2. The fiber of claim 1, wherein the polymer is polyvinylpyrrolidone.

3. The fiber of claim 1, wherein the liquid crystal is 4-cyano-4'-n-pentylbiphenyl.

4. The fiber of claim 1;
wherein the fiber has an average interference color wavelength within the visible spectrum; and
wherein at least 90% of the fiber has an interference color wavelength within 10% of the average interference color wavelength.

5. A nanofibrous mat comprising:
one or more of the fibers of claim 4.

6. A method comprising:
providing the fiber of claim 1 at a first temperature;
wherein the fiber exhibits a first interference color at the first temperature; and
changing the temperature of the fiber to a second temperature that causes the fiber to exhibit a second interference color different from the first interference color.

7. A fiber comprising:
a sheath comprising:
a polymer; and
a compound capable of photoisomerization;
wherein the sheath is transparent to visible light; and
a core comprising a non-cholesteric liquid crystal;
wherein the compound capable of photoisomerization extends into the core.

8. The fiber of claim 7, wherein the polymer is polyvinylpyrrolidone.

9. The fiber of claim 7, wherein the liquid crystal is 4-cyano-4'-n-pentylbiphenyl.

10. The fiber of claim 7, wherein the compound capable of photoisomerization is an azobenzene.

11. The fiber of claim 7, wherein the compound capable of photoisomerization is

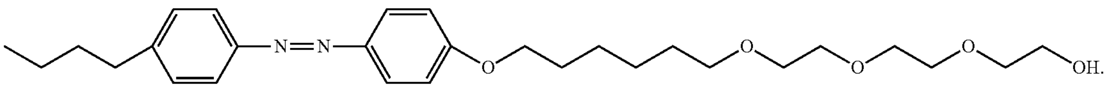 [SMILES: CCCCc1ccc(N=Nc2ccc(OCCCCCCOCCOCCOCCO)cc2)cc1]

12. The fiber of claim 7;

wherein the fiber has an average interference color wavelength within the visible spectrum; and wherein at least 90% of the fiber has an interference color wavelength within 10% of the average interference color wavelength.

13. A nanofibrous mat comprising:

one or more of the fibers of claim 7.

14. A method comprising:

providing the fiber of claim 7;

wherein the fiber exhibits a first interference color; and exposing the fiber to light of a wavelength that causes the fiber to exhibit a second interference color different from the first interference color.

15. A method comprising:

providing the fiber of claim 7 at a first temperature;

wherein the fiber exhibits a first interference color at the first temperature; and changing the temperature of the fiber to a second temperature that causes the fiber to exhibit a second interference color different from the first interference color.

16. A method comprising:

providing a first solution comprising:

15-20 wt. % of a polymer;

0.01-0.1 wt. % sodium chloride; and ethanol;

providing a second solution comprising a liquid crystal; and electrospinning the first solution and the second solution to form a fiber comprising:

a sheath comprising the polymer; and a core comprising the liquid crystal;

wherein the electrospinning is performed at:

5-13 kV;

8-14 cm from a substrate; and no more than 20% relative humidity.

17. The method of claim 16, wherein the polymer is polyvinylpyrrolidone.

18. The method of claim 16, wherein the liquid crystal is 4-cyano-4'-n-pentylbiphenyl.

19. The method of claim 16, wherein the first solution further comprises:

a compound capable of photoisomerization.

20. The method of claim 17, wherein the compound capable of photoisomerization is:

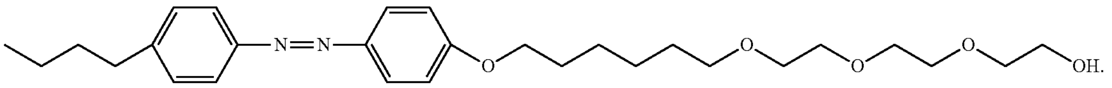 [SMILES: CCCCc1ccc(N=Nc2ccc(OCCCCCCOCCOCCOCCO)cc2)cc1]

21. A compound having the formula:

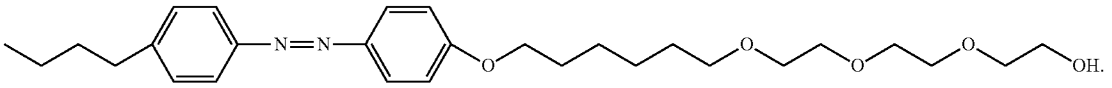 [SMILES: CCCCc1ccc(N=Nc2ccc(OCCCCCCOCCOCCOCCO)cc2)cc1]

* * * * *